United States Patent
Jain et al.

(10) Patent No.: US 11,751,024 B2
(45) Date of Patent: Sep. 5, 2023

(54) DATA SHARING AMONG USER DEVICES

(71) Applicant: QUALCOMM Incorporated, San Diego, CA (US)

(72) Inventors: Nikhil Jain, San Diego, CA (US); Justin McGloin, Los Altos, CA (US); Joel Linsky, San Diego, CA (US); James Robert Chapman, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 17/342,412

(22) Filed: Jun. 8, 2021

(65) Prior Publication Data
US 2022/0394436 A1    Dec. 8, 2022

(51) Int. Cl.
*H04W 4/38*        (2018.01)
*H04W 76/11*       (2018.01)
*H04W 12/72*       (2021.01)
*H04W 12/55*       (2021.01)
*H04W 12/033*      (2021.01)
*H04L 65/611*      (2022.01)
*H04W 60/00*       (2009.01)

(52) U.S. Cl.
CPC ............. *H04W 4/38* (2018.02); *H04L 65/611* (2022.05); *H04W 12/033* (2021.01); *H04W 12/55* (2021.01); *H04W 12/72* (2021.01); *H04W 60/00* (2013.01); *H04W 76/11* (2018.02)

(58) Field of Classification Search
CPC ....... H04W 4/38; H04W 76/11; H04W 12/72; H04W 12/55; H04W 12/033; H04W 60/00; H04W 4/80; H04L 67/10
See application file for complete search history.

(56) References Cited

U.S. PATENT DOCUMENTS 9,794,729 B2    10/2017  Meyers et al.
2014/0086438 A1  3/2014  Tachibana et al.
(Continued)

FOREIGN PATENT DOCUMENTS

WO    WO 2016191132    12/2016

OTHER PUBLICATIONS

International Search Report and Written Opinion—PCT/US2022/071373—ISA/EPO—dated Jul. 12, 2022.

*Primary Examiner* — Mandish K Randhawa
(74) *Attorney, Agent, or Firm* — QUALCOMM Incorporated

(57) ABSTRACT

Described are techniques for sharing data among a group of mobile devices that are registered to the same user. In some instances, the shared data is sensor data captured by a mobile device or media content being processed by the mobile device. The mobile devices in the group are configured to wirelessly communicate with each other and to share status information. Using the status information, the mobile devices can keep each other updated as to the operational status of each individual mobile device and, in some aspects, the status of a mobile device with respect to the user. The sensor data or media content can be forwarded to a different mobile device in response to a determination made based on the status information. For instance, forwarding can be based on a rule that specifies one or more conditions relating to the status of a mobile device and/or user status.

41 Claims, 12 Drawing Sheets

(56) References Cited

U.S. PATENT DOCUMENTS

| | | | |
|---|---|---|---|
| 2014/0334644 A1* | 11/2014 | Selig | G06F 3/165 |
| | | | 381/108 |
| 2016/0357510 A1* | 12/2016 | Watson | H04R 29/001 |
| 2018/0132028 A1* | 5/2018 | Nakai | H04R 1/1041 |
| 2021/0044957 A1* | 2/2021 | Norp | H04W 8/183 |

\* cited by examiner

Status Table 400

| Device | Audio Source 410 | LTE 430 | WiFi 440 | BT 450 | BTLE 460 | Speaker 420 | Disposition/User status 470 |
|---|---|---|---|---|---|---|---|
| Phone | Yes/No | Yes/No + IP ADDRESS | Yes/No + IP ADDRESS | Yes/No + MAC Address | Yes/No + MAC Address | Yes/No | With user/Not with user |
| Watch | Yes/No | Yes/No + IP ADDRESS | Yes/No + IP ADDRESS | Yes/No + MAC Address | Yes/No + MAC Address | Yes/No | Worn/Not Worn |
| Headset | Yes/No | Yes/No + IP ADDRESS | Yes/No + IP ADDRESS | Yes/No + MAC Address | Yes/No + MAC Address | Yes/No | In ear/Not in ear |

FIG. 4

Status Table 500

| Device | Audio Source | LTE | WiFi | BT | BTLE | Speaker | Disposition/User status |
|---|---|---|---|---|---|---|---|
| Phone | Yes – phone call | | | Yes | Yes | Yes | With user |
| Watch | No | | | Yes | Yes | Yes | Worn |
| Headset | No | | | Yes | Yes | Yes | In ear |

FIG. 5A

Status Table 510

| Device | Audio Source | LTE | WiFi | BT | BTLE | Speaker | Disposition/User status |
|---|---|---|---|---|---|---|---|
| Phone | Yes - phone call | Yes | Yes | No | No | Yes | Not with user |
| Watch | No | Yes | Yes | Yes | Yes | Yes | Worn |
| Headset | No | | | Yes | Yes | Yes | In ear |

FIG. 5B

| Device | Audio Source | LTE | WiFi | BT | BTLE | Speaker | Disposition/User status |
|---|---|---|---|---|---|---|---|
| Phone | Yes - phone call | Yes | Yes | No | No | Yes | Not with user |
| Watch | No | Yes | Yes | Yes | Yes | Yes | Worn |
| Headset | No | | | Yes | Yes | Yes | Not in ear |

Status Table 520

FIG. 5C

Configuration Table 700

| Data Source | Share Permissions | Forwarding Conditions |
|---|---|---|
| Stored Media | Yes - phone only | Upon request |
| Microphone | Yes - registered devices only | Rule A |
| Accelerometer | Yes - all devices | Rule B |
| Gyroscope | Yes - all devices | Upon request |
| Heart Rate Sensor | Yes - phone only | Rule C |

DATA SHARING AMONG USER DEVICES

BACKGROUND

1. Field of Invention

The present invention relates generally to the field of wireless communications, and more specifically to wireless communication of data among a group of mobile devices configured to share data with each other.

2. Description of Related Art

Users of smartphones, laptops, wearable devices, other user equipment (UE), and the like sometimes connect such mobile devices together for the purpose of communicating information between the mobile devices. For instance, a laptop may be connected via Bluetooth to a wireless headset. As another example, smartphones are sometimes connected to smartwatches in order to send and/or receive email, text messages, and other data from the smartphone to the smartwatch. In some instances, the data communicated between a user's mobile devices is sensor data collected by one of the mobile devices. For example, smartwatches are sometimes equipped with an optical sensor for monitoring a user's heart rate. By pairing a smartwatch to a smartphone, the user may be able to view heart rate information collected by the smartwatch on their smartphone.

BRIEF SUMMARY

The present disclosure describes techniques for sharing data among a group of mobile devices that are registered to the same user. For instance, the mobile devices may be linked to the same user identifier such as an International Mobile Subscriber Identity number corresponding to a user account of a subscriber to a cellular service. The data shared can be sensor data captured by a mobile device. Another type of data that can be shared is media content (e.g., an audio stream). Other types of data may also be shared among connected devices.

In some aspects, data is forwarded based on status information that is shared among a group of mobile devices. Status information may be used to keep each device among the group updated with regard to, for example, what types of connectivity are available to any particular device (e.g., Wi-Fi, Bluetooth, Near Field Communication, and other wireless protocols) and what devices are currently connected to each other. Additionally, in some aspects, status information may indicate a status of each device in the group of mobile devices with respect to a user. For example, the status information may indicate whether the user is wearing a headset and whether the headset is actively communicating with an audio source such as a smartphone. As another example, the status information may indicate whether the user is within operating range of the smartphone. Status information can be maintained in a memory of each mobile device so that all mobile devices that are currently connected together (directly or indirectly) are aware of each other's status and/or the status of each other with respect to the user.

A decision to share a data item may, in some instances, involve a determination of which mobile device among the group of mobile devices is the most appropriate consumer for the data item. This decision can be made by one or more devices among the group of mobile devices, e.g., individually or as a collective decision. In some aspects, the decision is based on configurable rules or logic that specify one or more forwarding conditions, where the forwarding conditions relate to status information.

In some aspects, a mobile device includes a sensor, a memory, and one or more processing units communicatively coupled to the sensor and the memory. The sensor is configured to capture sensor data. The memory stores information about a plurality of mobile devices that are registered in association with an identifier of a user, the plurality of mobile devices including the first mobile device and a second mobile device. The one or more processing units are configured to update the status information based on wireless communication between the first mobile device and other members of the plurality of mobile devices, the wireless communication being performed using one or more wireless communication protocols. The status information is shared among the plurality of mobile devices due to each mobile device being registered in association with the identifier of the user. The status information indicates, for each mobile device, which of the one or more wireless communication protocols the mobile device is currently using to communicate with another mobile device. The status information further indicates a current status of each mobile device with respect to the user. The one or more processing units are further configured to determine, based on the current status of each mobile device with respect to the user, that the sensor data or a media content being processed by the first mobile device is to be forwarded to the second mobile device for input to a software application executing on the second mobile device. The one or more processing units are further configured to cause the sensor data or the media content to be forwarded to the second mobile device.

In some aspects, a method for sharing data among mobile devices involves updating, by a first mobile device among a plurality of mobile devices including a second mobile device, status information stored in a memory of the first mobile device. The updating is based on wireless communication between the first mobile device and other members of the plurality of mobile devices, the wireless communication being performed using one or more wireless communication protocols. The status information is shared among the plurality of mobile devices due to each mobile device being registered in association with an identifier of a user. The status information indicates, for each mobile device, which of the one or more wireless communication protocols the mobile device is currently using to communicate with another mobile device. The status information further indicates a current status of each mobile device with respect to the user. The method further involves determining, by the first mobile device and based on the current status of each mobile device with respect to the user, that sensor data captured by the first mobile device or a media content being processed by the first mobile device is to be forwarded to the second mobile device for input to a software application executing on the second mobile device; and causing, by the first mobile device, the sensor data or the media content to be forwarded to the second mobile device. Additionally, in some aspects, the method is implemented through instructions stored on a non-transitory computer-readable medium, where the instructions are executable by one or more processors to cause the one or more processors to perform the method.

In some aspects, a system includes a plurality of mobile devices, the plurality of mobile devices including a first mobile device and a second mobile device. Each mobile device of the plurality of mobile devices is equipped with one or more sensors. The mobile devices are configured to communicate with each other using one or more wireless communication protocols. The mobile devices are further configured to share status information with each other due to each mobile device being registered in association with an identifier of a user. The status information indicates, for each mobile device, which of the one or more wireless communication protocols the mobile device is currently using to communicate with another mobile device. The status information further indicates a current status of each mobile device with respect to the user. Based on the current status of each mobile device with respect to the user, sensor data captured by the first mobile device or a media content being processed by the first mobile device is forwarded to the second mobile device for input to a software application executing on the second mobile device.

In some aspects, a system includes means for updating status information stored in a memory of a first mobile device among a plurality of mobile devices including a second mobile device. The updating is based on wireless communication between the first mobile device and other members of the plurality of mobile devices, the wireless communication being performed using one or more wireless communication protocols. The status information is shared among the plurality of mobile devices due to each mobile device being registered in association with an identifier of a user. The status information indicates, for each mobile device, which of the one or more wireless communication protocols the mobile device is currently using to communicate with another mobile device. The status information further indicates a current status of each mobile device with respect to the user. The system further includes means for determining, based on the current status of each mobile device with respect to the user, that sensor data captured by the first mobile device or a media content being processed by the first mobile device is to be forwarded to the second mobile device for input to a software application executing on the second mobile device. The system further includes means for forwarding the sensor data or the media content to the second mobile device.

BRIEF DESCRIPTION OF THE DRAWINGS

FIG. 4 shows an example data structure for maintaining status information in a memory of a mobile device, according to an embodiment.

FIGS. 5A to 5C show examples of how the data structure in FIG. 4 can be updated based on status changes.

FIG. 7 shows an example data structure for maintaining configuration information in a memory of a mobile device, according to an embodiment.

Figure 1:
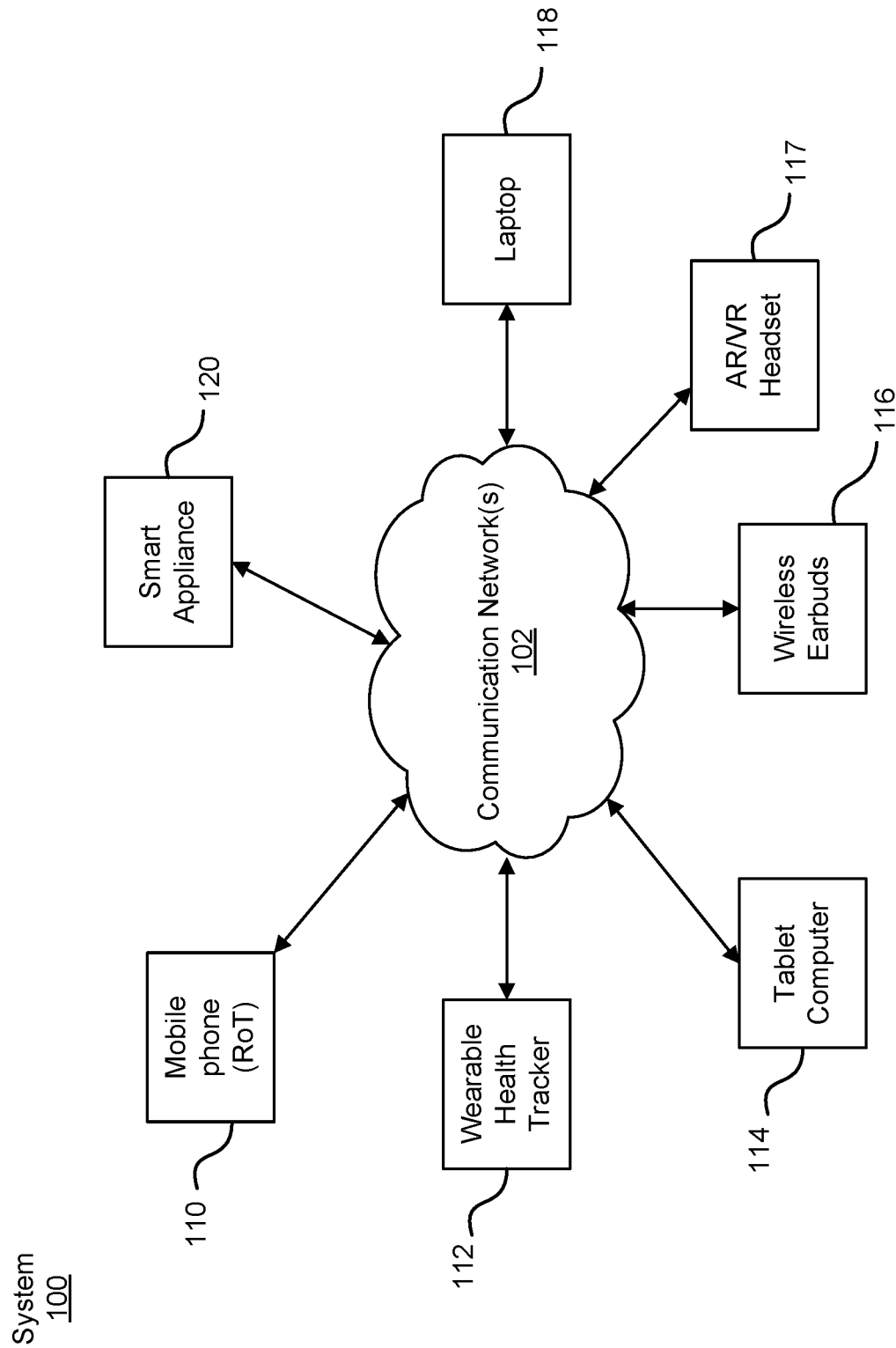
FIG. 1 is a block diagram of a system according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While some embodiments in which one or more aspects of the disclosure may be implemented as described below, other embodiments may be used, and various modifications may be made without departing from the scope of the disclosure.

Users of smartphones, laptops, wearable devices, other user equipment (UE), and the like sometimes connect such mobile devices together for the purpose of communicating information between the mobile devices. Connecting mobile devices to each other sometimes involves a manual pairing procedure. For instance, pairing a first device to a second device may involve activating a Bluetooth transceiver on the first device concurrently with a Bluetooth transceiver on the second device, then inputting a security code generated and displayed on the first device to a keypad of the second device. Pairing can be laborious and time-consuming when there are many mobile devices to connect. Further, pairing is usually done on a one-to-one basis and generally does not permit devices to communicate with each other without being directed paired. For example, a smartphone may be paired with a smartwatch via a first pairing procedure and with a headset via a second pairing procedure that is performed separately. Upon completion of the first and second pairing procedures, the smartphone may be able to communicate with the smartwatch and the headset, but communication between the smartwatch and the headset may not be possible even though both are connected to the smartphone. The inability to communicate may be due to a lack of trust between devices, e.g., because the devices are not paired directly with each other and/or do not share the same set of security credentials such encryption keys.

Another challenge with operating mobile devices that are connectable to each other is determining when to send data from one device to another. In a relatively simple device ecosystem, each mobile device may be configured with a specific set of functions that are non-overlapping with those of another mobile device. For example, a smartphone may be paired with a dedicated heart rate monitor, where the heart rate monitor lacks an ability to present email, audio, or other content. In a more complex device ecosystem, multiple devices may be capable of generating and/or using the same types of data. For example, a smartphone, a smartwatch, and a headset may each be equipped with a speaker capable of playing audio content, thus providing a user with the option of manually selecting which of these three devices is used to play the audio content (e.g., an audio file that is stored in a memory of the smartphone or on a remote server). It may therefore be useful to have a mechanism by which mobile devices capable of consuming the same data can reach an agreement as to which mobile device should access the data at any given time.

FIG. 1 shows an example of a system 100 according to an embodiment. The system 100 includes a plurality of mobile devices, such as a mobile phone 110, a wearable health tracker 112, a tablet computer 114, wireless earbuds 116, an augmented reality (AR) or virtual reality (VR) headset 117, a laptop 118, and a smart appliance 120. FIG. 1 is intended to illustrate examples of some types of mobile devices that can form a system of connected devices. In general, any mobile device capable of wireless communication can be used to form the system 100.

As shown in FIG. 1, the mobile devices are connected via one or more communication networks 102. The network(s) 102 can include at least one network that is accessible wirelessly. Additionally, at least some of the mobile devices in FIG. 1 may be in connected to each other through a peer to peer connection, for example, via Bluetooth, Wi-Fi, near field communication (NFC), or other wireless communication protocols. Thus, communication among the mobile devices may involve direct messaging from one mobile device to another, a mobile device operating as an intermediary between a pair of mobile devices, or messages communicated with the aid of a network entity such as a wireless router, a switch, a Domain Name System (DNS) server, and the like. For simplicity, direct connections between mobile devices are omitted from FIG. 1.

Communications conducted between the mobile devices of system 100 can be secured using an encryption protocol. In some embodiments, the mobile devices are configured to use the same encryption protocol, e.g., Advanced Encryption Standard (AES). This shared encryption protocol may be specified by a Root of Trust (RoT) device, which can be one of the mobile devices. In the example of FIG. 1, the RoT device is the mobile phone 110. Because mobile phone 110 is an RoT, other mobile devices that are connected to the mobile phone 110 can trust each other without having to go through a conventional pairing procedure. For example, the wearable health tracker 112 and the wireless earbuds 116 may permit sharing of data with each other as a result of both the wearable health tracker 112 and the wireless earbuds 116 being paired with the mobile phone 110. In some implementations, trust between mobile devices is established using a registration process in which the mobile devices that form the system 100 become associated with an identifier of a user, for example, an International Mobile Subscriber Identity (IMSI) number corresponding to a user account of a subscriber to a cellular service. Devices that are not registered to the same identifier may be treated as untrusted devices. Consequently, unregistered devices may be prevented from accessing data that is shared among the registered devices, such sensor data, media content, or the status information described below.

At least some of the mobile devices in the system 100 are equipped with a sensor. In some implementations, every mobile device in system 100 has at least one sensor integrated into or connected (e.g., by cable) to the mobile device. A sensor of a mobile device may be configured to capture sensor data relating to a user and/or the physical environment around the mobile device. For example, mobile phone 110 can be a smartphone with an integrated touch screen display. The touch screen display may include capacitive or resistive touch sensing circuitry configured to detect movement of the user's finger or a stylus pen. Mobile phone 110 may also include a front-facing camera, a rear-facing camera, a gyroscope, an accelerometer, a microphone, a Global Positioning System (GPS) sensor, and/or other sensors.

Similarly, the wearable health tracker 112 may be a smartwatch with a heart rate sensor, a microphone, and/or a gyroscope for detecting the orientation of the smartwatch (and thus the user's wrist); tablet computer 114 may include a touch screen, a webcam, and/or a gyroscope; wireless earbuds 116 may include a heart rate sensor and/or a microphone; AR/VR headset 117 may include a front-facing camera for tracking eye or facial movements of the user, a rear-facing camera for capturing images of the environment, a gyroscope for detecting the orientation of the headset (and thus a direction in which the user is facing), and/or a contact sensor for detecting whether the user is wearing the AR/VR headset 117; laptop 118 may include a touch pad, a microphone, and/or a webcam; and smart appliance 120 may include a thermometer, an ambient light sensor, and/or a motion detector. Thus, the mobile devices in the system 100 can include any number of sensors that can capture sensor data for consumption by the mobile device and/or consumption by another mobile device.

The way in which sensor data or other data such as media content is consumed may depend on software applications executed by the mobile devices. For instance, mobile phone 110 may include a fitness application for tracking user activity (e.g., running routes, number of steps walked, hours spent sleeping, average heart rate, etc.) based on sensor data captured by the mobile phone 110 and/or sensor data captured by the wearable health tracker 112. As another example, the mobile phone 110, the tablet computer 114, the laptop 118, or some other computing device in the system 100 may execute an application that controls the presentation of AR or VR content on the AR/VR headset 117. In some instances, different versions of the same application may be executable on multiple devices. For instance, the above-mentioned fitness application may be installed on both the wearable health tracker 112 and the mobile phone 110.

In the absence of data sharing, the functionality of the software applications may be limited based on the types of data that are available locally. Thus, the fitness application on the wearable health tracker 112 may be able to present real-time heart rate information on a display of the wearable health tracker 112, but may not be able to do so in conjunction with tracking the user's geographic movements. However, if heart rate data is transmitted from the wearable health tracker 112 to the mobile phone 110, the fitness application on the mobile phone 110 could use the heart rate data to show a map of the user's geographic movement (e.g., using a GPS sensor of the mobile phone) together with changes in heart rate as the user moves.

Another problem that impacts user experience relates to deciding how and when to use sensor or other data available to the mobile devices. In some instances, multiple devices may be capable of consuming the same data for the same or different purposes. As discussed above, heart rate data may be consumed by a fitness application executed on the mobile phone 110 or the wearable health tracker 112 to, for example, output a real-time display of the user's heart rate. Mobile devices can also use the same data in different ways. For example, AR/VR headset 117 may execute a VR game that uses head movements as input; independently of the VR game, the mobile phone 110 may use head movements to show a direction in which the user is facing/user orientation with respect to a geographic map, as part of executing a navigation application. Thus, data available to one mobile device may be capable of being processed by multiple mobile devices, possibly concurrently. From a user standpoint, it may be desirable to automatically select which mobile device is the consumer of the data regardless of where the data originated. For example, the user may desire to have audio streamed to the wireless earbuds 116 whenever the wireless earbuds 116 are turned on rather than, for example, defaulting to a speaker of the mobile phone 110 or the laptop 118. Additionally, due to the portable nature of mobile devices, it is sometimes desirable to switch between mobile devices during a user interaction. For example, audio or other media content may initially be presented via the mobile phone 110, but if the user is no longer in the vicinity of the mobile phone 110 (e.g., the user moves to another room or, in general, out of operating range) it may be useful to switch to presenting the media content on a smartwatch or other device that the user is wearing or carrying.

In order to address the above-mentioned problems, the mobile devices of the system 100 can be configured to share information with each other. As discussed in further detail below, shared information can include not only sensor or other data for consumption by a mobile device, but also status information. The status information may relate to the current operational status of a mobile device (e.g., whether the mobile device is turned on, idle, in sleep mode, what wireless communication protocol(s) the mobile device is using to communicate with another mobile device in the system, the quality (e.g., signal strength) of a wireless connection that has been established to the mobile device, locked versus unlocked, etc.). The status information may also relate to a status of the user including, for example, a status of a mobile device with respect to the user. Such information can be useful in deciding whether to switch mobile devices or to forward data to a mobile device. For instance, it may be useful to know whether the user is interacting with a mobile device, in operating range of the mobile device, wearing the mobile device, and the like. Accordingly, status information can include information on operational status (e.g., device state) and contextual information about the context in which a mobile device is being used. Status of the mobile device with respect to the user is one example of contextual information. However, contextual information can be any information that indicates how a mobile device is currently being used and may, for example, include information about the physical environment around the mobile device (e.g., indoor, outdoor, loud and noisy, quiet) and/or information about user activity and how the user activity affects the mobile device (e.g., moving, stationary, in ear, on wrist).

Figure 2:
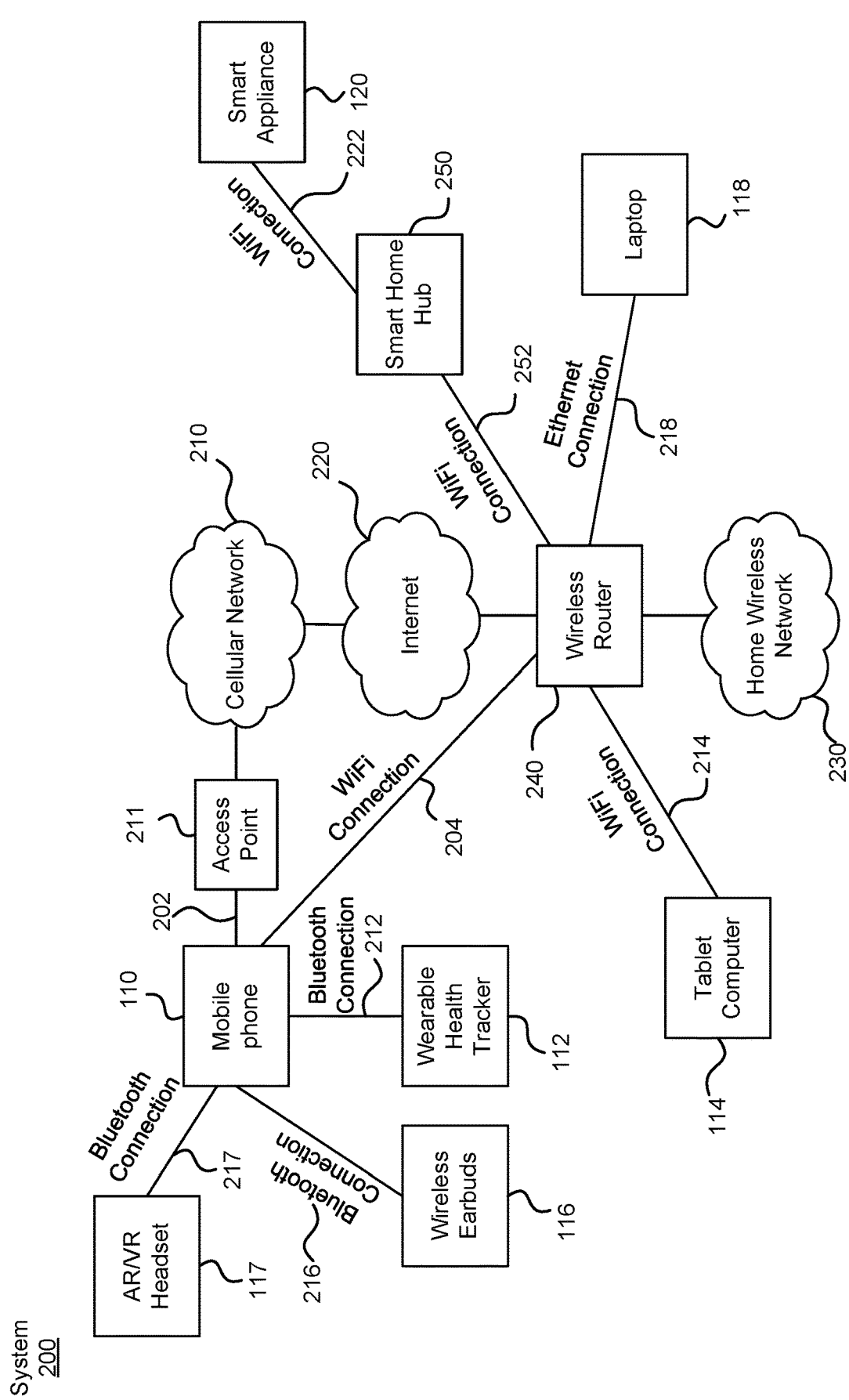
FIG. 2 is a block diagram showing an example implementation of the system in FIG. 1.

FIG. 2 shows a system 200 corresponding to an example implementation of the system 100. FIG. 2 is intended to illustrate how mobile devices may communicate with each other, e.g., to transmit sensor data, status information, or other data from one mobile device to another. As depicted in FIG. 2, the mobile devices may be connected using multiple types of wireless connections, each of which permits communication via a wireless protocol such as Bluetooth or Wi-Fi (IEEE 802.11x). In some instances, a mobile device may be configured to communicate wirelessly and by wireline. For example, as shown in FIG. 2, the laptop 118 may be connected to a wireless router 240 via an Ethernet connection, but laptop 118 may also include a wireless network card capable of connecting to the wireless router 240 using Wi-Fi. Other examples of wireless connections between the various mobile devices include a Bluetooth connection 212 between mobile phone 110 and wearable health tracker 112, a Bluetooth connection 216 between mobile phone 110 and wireless earbuds 116, a Bluetooth connection 217 between mobile phone 110 and AR/VR headset 117, a Wi-Fi connection 204 between mobile phone 110 and wireless router 240, a Wi-Fi connection 214 between tablet computer 114 and wireless router 240, a Wi-Fi connection 222 between smart appliance 120 and a smart home hub 250, and a Wi-Fi connection 252 between smart home hub 250 and wireless router 240.

As shown in FIG. 2, the system 200 may include various infrastructure entities that facilitate communication among the mobile devices. For example, an access point 211 may permit mobile phone 110 to access a cellular network 210 (e.g., a fourth generation (4G), fifth generation (5G), or Long Term Evolution (LTE) network). Similarly, the smart home hub 250 and the wireless router 240 may connect together different smart appliances such as the smart appliance 120. Thus, communication between mobile devices may occur over public and/or private networks, for example, the cellular network 210, Internet 220, and a home wireless network 230. Other examples of networks that can be used to form the communication network 102 in FIG. 1 include a local area network (LAN), a wide area network (WAN), an internet of things (IoT) network, and/or other types of communication networks through which data is communicated wirelessly and/or by wireline. Using these networks, a mobile device can send data to another mobile device (directly or via an intermediary such as a third mobile device) and request data from another mobile device (e.g., on-demand or via subscription). Additionally, as discussed above, mobile devices may engage in peer to peer communication, for example, via the Bluetooth connections 212, 216, and 217.

Figure 3:
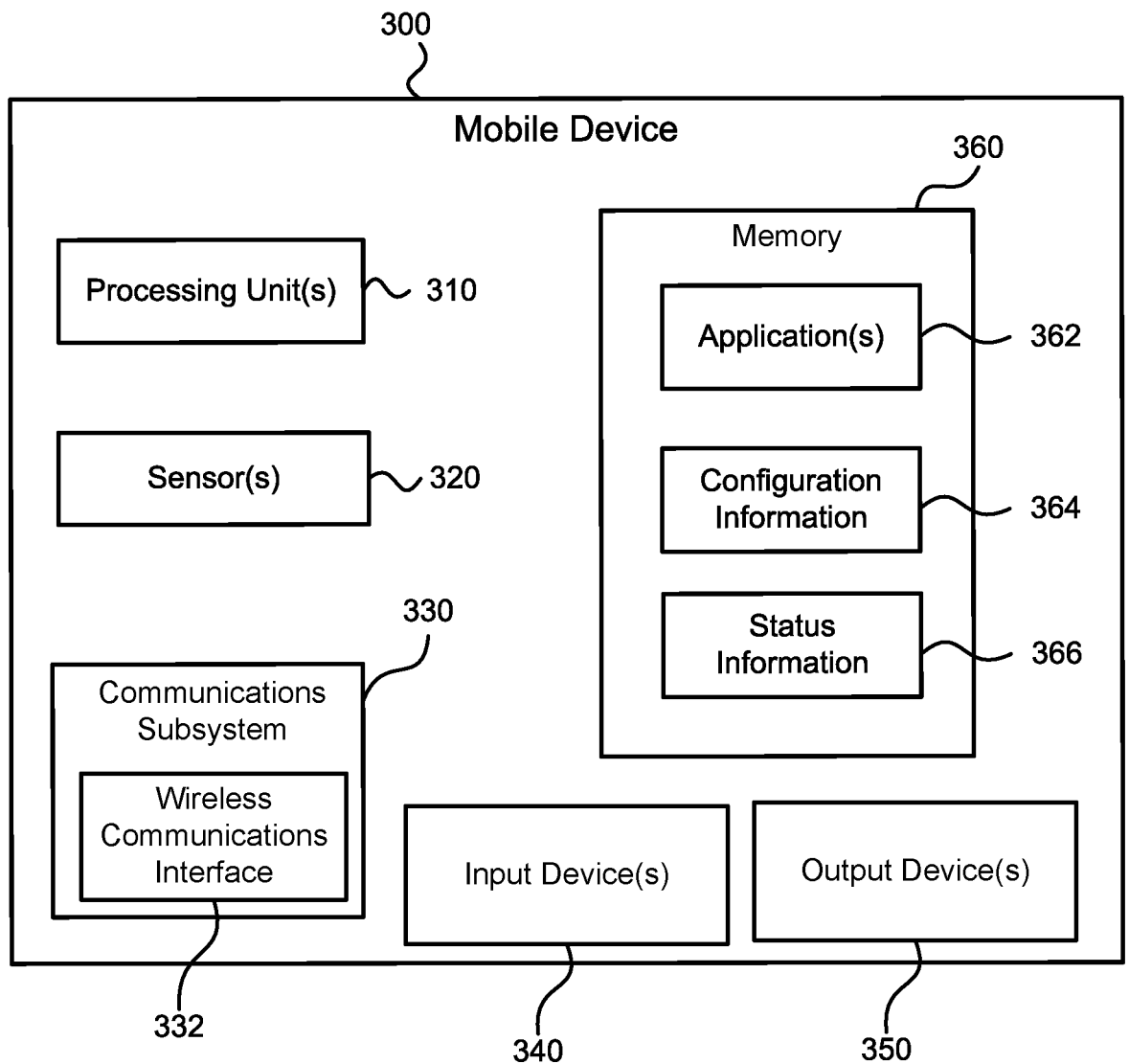
FIG. 3 is a block diagram of a mobile device according to an embodiment.

FIG. 3 is a block diagram of a mobile device 300, which can be utilized as described in the embodiments described herein. It should be noted that FIG. 3 is meant only to provide a generalized illustration of various components of mobile device 300, any or all of which may be utilized as appropriate. In other words, because mobile devices can vary widely in functionality, they may include only a portion of the components shown in FIG. 3. It can be noted that, in some instances, components illustrated by FIG. 3 can be localized to a single physical device and/or distributed among various networked devices, which may be disposed at different physical locations. Thus, mobile device 300 represents one way in which a mobile device in any of the systems described herein can be implemented.

The hardware elements of mobile device 300 shown in FIG. 3 can be electrically coupled via a bus (or may otherwise be in communication, as appropriate). The hardware elements may include processing unit(s) 310 which may comprise, without limitation, one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. The mobile device 300 also may include one or more sensors 320, a communications subsystem 330, one or more input devices 340, one or more output devices 350, and a memory 360.

Sensors 320 may include, without limitation, one or more instances of any of the following: heart rate sensors, blood pressure sensors, motion detectors (e.g., ultrasonic motion sensors), inertial sensors (e.g., accelerometers, gyroscopes, and or other Inertial Measurement Units (IMUs)), cameras, magnetometers, compasses, altimeters, microphones, proximity sensors, light sensors, thermometers, barometers, and/or the like, which may be used to complement and/or facilitate the functionality described herein.

In some instances, a sensor of the mobile device 300 may function as an input device that receives user input. For instance, input devices 340 may include, without limitation, one or more instances of touch screens, touch pads, microphones, and/or the like. Other examples of input devices 340 include keyboards, mice or track pads, numerical keypads, buttons, dials, switches, and/or the like. Further, sensors may be incorporated into other subsystems within the mobile device 300, for example, a GPS sensor within communications subsystem 330.

Output devices 350 may include, without limitation, one or more displays, light emitting diodes (LEDs), speakers, and/or the like. An output device 350 can be used to present audio, visual, haptic, or other output to a user. In some instances, output presented via an output device 350 may be generated as a result of processing sensor data (e.g., data captured by a sensor 320 of the mobile device 300 or a sensor of another mobile device). For example, output devices 350 may include a display controlled by a software application 362 to present a map of a running route together with information such as heart rate, travel speed, blood pressure, running cadence measurements, and/or the like. In other instances, output presented via an output device 350 may be generated as a result of processing media content, for example, an audio file (e.g., a song), a video file (e.g., an online video), or an audio portion of a telephone call (e.g., audio captured by a mobile phone of another user).

Communications subsystem 330 may be configured according to wireless communication technologies managed and controlled by a wireless communication interface 332, as well as wired technologies (such as Ethernet, coaxial communications, universal serial bus (USB), and the like). The wireless communication interface 332 may send and receive wireless signals (e.g. signals according to 5th Generation New Radio (5G NR) or LTE) via one or more wireless antennas. Thus the communications subsystem 330 may include a modem, a network card (wireless or wired), an infrared communication device, a wireless communication device, and/or a chipset (such as a Bluetooth device, an IEEE 802.11 device, an IEEE 802.15.4 device, a Wi-Fi device, a WiMAX device, cellular communication facilities, etc.), and/or the like. The mobile device 300 can use the communications subsystem 330 to communicate on any or all of the communication networks described herein to any device on the respective network, including another instance of mobile device 300 and other computer systems or devices such as a data center or a cloud server. Hence, the communications subsystem 330 may be used to receive and send data as described in the embodiments herein.

Depending on desired functionality, the wireless communication interface 332 may include a separate transceiver, receiver and transmitter, or any combination of transceivers, transmitters, and/or receivers to communicate with base stations and other terrestrial transceivers, such as wireless devices and access points. The mobile device 300 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as CDMA2000, Wideband-CDMA (WCDMA), and so on. A TDMA network may implement Global System for Mobile Communications (GSM), Digital Advanced Mobile Phone System (D-AMPS), or some other RAT. An OFDMA network may employ LTE, LTE Advanced, New Radio (NR) and so on. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

As discussed above, mobile device 300 can include a GPS sensor. More generally, mobile device 300 may include, as part of wireless communications interface 332, one or more Global Navigation Satellite System (GNSS) receivers configured to receive signals from a satellite system such as GPS, GLONASS, Galileo or Beidou over China, or some other local or regional Satellite Positioning System (SPS) such as Indian Regional Navigational Satellite System (IRNSS), Wide Area Augmentation System (WAAS), or European Geostationary Navigation Overlay Service (EGNOS). The mobile device 300 may process the signals received by the GNSS receiver(s) to estimate a position of the mobile device 300, possibly in cooperation with a location server, other mobile devices, and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., WAAS, EGNOS, Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

Memory 360 can include volatile and/or non-volatile memory devices. For example, memory 360 may comprise, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like. The storage device(s) of memory 360 may also be configured as working memory, e.g., for temporary storage of data generated as a result of processing performed by the processing unit(s) 310.

The memory 360 may store software elements such as applications 362. Examples of applications 362 include, without limitation, an operating system, device drivers, executable libraries, and/or other code. The applications 362 may include computer programs provided by various embodiments, and/or may be designed to implement methods, and/or configure systems, provided by other embodiments, as described herein. By way of example, one or more procedures described herein with respect to the functionality of a mobile device might be implemented as code and/or instructions executable by the mobile device 300 (e.g., using processing unit(s) 310). In an aspect, then, such code and/or instructions can be used to configure and/or adapt a general-purpose computer (or other device) to perform one or more operations in accordance with the described methods.

One or more applications 362 may be configured to generate output based on processing of sensor data or other data originating from the mobile device 300 or from another device in communication with the mobile device 300. For instance, output generated by an application 362 can include audiovisual output for presentation to the user of mobile device 300 and/or a file for storage in memory 360 or remotely, and can be generated as a result of processing user input supplied through an input device 340, sensor data captured by a sensor 320, and/or data received via wireless communications interface 332.

In some aspects, an application 362 may be permit the user of the mobile device 300 to register the mobile device 300 and/or other mobile devices owned by the user in association with each other (e.g., linking the mobile devices of the system 100 or 200 to the same user identifier). Registration be performed manually and/or in an automated fashion. For instance, if the user identifier is an IMSI tied to a subscriber identification module (SIM) card installed on the mobile phone 110, a list of registered devices may automatically include the mobile phone 110. When the user pairs the mobile phone 110 with another mobile device (e.g., an instance of mobile device 300), the mobile phone 110 and/or the other mobile device can prompt the user to confirm whether to associate the other mobile device with the IMSI. Mobile device 300 may also generate a user interface that permits the user to add or remove devices from the list of registered devices, set device permissions (e.g., to allow or disallow access by a mobile device 300 to certain types of data), and/or perform other configurations for each of the mobile devices in the system 100 or 200. Configuration by the user need not be performed on the mobile device being registered. For instance, in some implementations, registration may involve accessing a portal via a web browser of a personal computer or a device other than the mobile device being registered. A copy of the list of registered devices can be maintained locally within the memory 360 of each mobile device 300 in the system (e.g., as part of configuration information 364). The local copy of the list can be synchronized to a master copy stored by an RoT device (e.g., mobile phone 110 in FIG. 1) or on a remote server. Changes to the list can be propagated to each mobile device in the system so that all registered devices are aware of other devices that are registered to the same user identifier.

Configuration information 364 can include device-specific and/or application-specific settings, such as user-customized settings for one or more of the applications 362. For example, configuration information 364 can include rules for determining when sensor data or other data is to be provided to an application 362 or sent to an application executing on another mobile device. In some instances, the configuration information 364 may indicate that an application 362 is subscribed to one or more types of data and/or conditions for triggering forwarding of data for input to the application (e.g., send audio to wireless earbuds 116 whenever the wireless earbuds 116 are turned on and connected to an audio source such as mobile phone 110 or laptop 118, synchronize data stored on mobile phone 110 and laptop 118 every twenty four hours, send heart rate data captured by wearable health tracker 112 to mobile phone 110 whenever a fitness application is running simultaneously on both the wearable health tracker 112 and the mobile phone 110, etc.). Forwarding conditions can be in the form of rules (e.g., Boolean expressions), truth tables, program code (e.g., if-then-else statements), hardwired in circuitry, and/or the like. In some instances, configuration information 364 may specify how frequent data is to be sent to or from a mobile device or other transmission parameters such as bandwidth limits/requirements, data quality (e.g., degree of data compression), limits on the maximum amount of data that can be transmitted, and/or the like.

Memory 360 may further be configured to store status information 366. The status information 366 can include any of the types of status information discussed above, e.g., the examples of status information described with respect to FIG. 1. Status information 366 can be updated based on communications with other mobile devices 300 to indicate the operational statuses of the mobile devices. For instance, status information 366 maintained by AR/VR headset 117 may indicate whether a wireless connection has been established to mobile phone 110 and, if so, what wireless communication protocol(s) are currently being used by the mobile phone 110.

Status information 366 can, in some instances, indicate user status and/or include other types of contextual information. Thus, the status information 366 could indicate the status of the mobile device 300 or another registered device with respect to the user or the status of a user activity (e.g., the user is running, asleep, standing, sitting, driving or riding a vehicle, etc.). User status can be determined based on sensor data captured by the mobile device 300 or sensor data captured by another mobile device in the system. For example, the status information 366 can be updated to indicate that the user is running based on movement of the user's wrist as captured by an accelerometer of the wearable health tracker 112. As another example, the status information 366 can be updated to indicate that even though the wireless earbuds 116 are connected to the mobile phone 110, the wireless earbuds are not currently being worn, based on data captured by a sensor of the wireless earbuds 116. Similarly, the user no longer being within operating range of the mobile phone 110 can be inferred from knowledge that the user is wearing the wireless earbuds 116 in combination with the presence of a low quality wireless connection (e.g., signal strength below a threshold) or the absence of any wireless connection between the wireless earbuds 116 and the mobile phone 110.

Because status information 366 is shared among the various mobile devices in the system, each mobile device can be kept updated regarding the operational statuses of other mobile devices and, optionally, user status/context. Any mobile device in the system can generate the status information 366. For example, some of the status information 366 may be generated by the mobile device 300 based on processing of sensor data or other data communicated to the mobile device 300 from another mobile device in the system. After generating status information, the mobile device may share the status information with other registered devices. Similarly, other registered devices can generate and communicate status information 366 to the mobile device 300.

In some instances, the status information 366 may be a result of a collective decision-making process involving processing by multiple mobile devices. For instance, wearable health tracker 112 may determine, using one or more of its sensors, that the user is wearing the wearable health tracker 112. Further, the wearable health tracker 112 may determine that it has no wireless connection or a poor wireless connection to the mobile phone 110. Concurrently, the wireless earbuds 116 may determine, using one or more of its sensors, that the user is wearing the wireless earbuds 116. Like the wearable health tracker 112, the wireless earbuds 116 may determine that it has no wireless connection or a poor wireless connection to the mobile phone 110. Based on these determinations, the wireless earbud 116 and/or the wearable health tracker 112 may conclude that the mobile phone 110 is no longer within operating range of the user. Thus, status information 366 can enable the mobile devices to inform each other as to whether any individual mobile device is available/unavailable to the user (e.g., based on user proximity to the mobile device). Status information 366 can be communicated using communications subsystem 330 and, in some implementations, is broadcast or multicast to neighboring mobile devices via the wireless communications interface 332. Additionally, communications subsystem 330 may, in some instances, communicate status information 366 via peer to peer communication, where the receiving device in turn relays the status information 366 to one or more additional mobile devices via peer to peer communication or broadcast/multicast.

Some embodiments may incorporate a voting mechanism in which mobile devices reach a consensus regarding user status (or context in general) when a threshold number or majority of the voting devices reach the same conclusion. Additionally, the status information 366 may include confidence metrics that reflect how confident a mobile device is regarding its determinations of user status/context. Confidence metrics can be incorporated into a voting procedure and may also be used to determine whether conditions for forwarding data to another mobile device are satisfied. In general, a mobile device will have a higher degree of confidence as to a user status/context that the mobile device can determine independently of communication with another mobile device (e.g., whether the user is wearing the device or interacting with the device). Generating the status information using input from multiple mobile devices helps to avoid false conclusions. For example, wireless earbud 116 may experience a poor wireless connection to mobile phone 110 due to temporary electromagnetic interference, but it is unlikely that two devices being worn or carried by the user both experience poor wireless connection to the mobile phone 110 unless the mobile phone is in fact no longer with the user.

FIG. 4 shows an example data structure for maintaining status information in a memory of a mobile device, according to an embodiment. The data structure is in the form of a status table 400. For simplicity, only three devices are shown in the status table 400: a phone (e.g., mobile phone 110), a watch (e.g., wearable health tracker 112), and a headset (e.g., AR/VR headset 117). The devices listed in the status table 400 may correspond to registered mobile devices. For example, status table 400 may be populated using a list of registered devices included in configuration information 364. Status table 400 is organized as an "awareness matrix" comprising data entries that correspond to various items of status information. The data entries in the status table 400 can be updated based on inter-device communication to reflect device capabilities, the operational statuses of the mobile devices, and user status or context.

Capability information in the status table 400 can be used to indicate hardware and/or software capabilities of the mobile devices, such as input capabilities, output capabilities, and/or sensor capabilities. For example, as shown in FIG. 4, status table 400 may include a column 410 indicating whether a mobile device is operating or capable of operating as a source of audio data. Status table 400 may further include a column 420 indicating whether a mobile device is equipped with a speaker that is presenting or capable of presenting audio output.

Connectivity information in the status table 400 can be used to indicate whether there is an active connection to any of the devices listed in the status table. For example, status table 400 may include a column 430 indicating whether an LTE connection has been established to a listed device, a column 440 indicating whether a Wi-Fi connection has been established to a listed device, a column 450 indicating whether a Bluetooth (BT) connection has been established to a listed device, and a column 460 indicating whether a Bluetooth Low Energy (BTLE) connection has been established to a listed device. The columns 430, 440, 450, and 460 may further indicate an address assigned to a mobile device for use in communicating over a corresponding connection, for example, an Internet Protocol (IP) address, a media access control (MAC) address, and/or the like.

User status information in the status table 400 can be used to indicate a status of the user. As discussed above, user status may in some instances refer to the status of a mobile device with respect to the user. For example, as shown in FIG. 4, the column 470 can indicate whether the phone is with the user, whether the user is wearing the watch, and whether the headset is in the user's ear. Further, as discussed above, user status can be determined based on inter-device communication. For example, a determination as to whether the phone is with the user can be made based on the presence/absence of wireless connections to the phone, as indicated in columns 430, 440, 450, and 460. Thus, if the phone is not within Wi-Fi, BT, or BTLE range of the watch and/or the headset, then it may be inferred that the phone is not with the user. Further, user status can be based on sensor data. For example, if a heart rate sensor of the watch detects the user's heartbeat, then column 470 can be updated to indicate that the watch is being worn.

The status table 400 can be maintained in a memory of each mobile device listed in the status table. When a change occurs with respect to a data entry in the status table 400, the change or the updated status table can be communicated to other listed mobile devices by a mobile device that caused the change or a mobile device that detected the change. For instance, when the phone establishes a Bluetooth connection to the watch, the phone may update its local copy of the status table 400 to indicate that a Bluetooth connection to the watch is available. Similarly, the watch may update its local copy of the status table 400 upon establishing the Bluetooth connection to the phone. Further, the phone and/or the watch may inform the headset about the presence of the Bluetooth connection so that the status tables in the memories of the phone, the watch, and the headset are kept synchronized.

FIG. 5A shows a status table 500 representative of the status table 400 updated to reflect a scenario in which a phone call may be presented using a speaker of a headset. Status table 500 indicates that the phone is acting as an audio source for the phone call. Status table 500 further indicates that the phone is currently connected via BT and BTLE, are the watch and the headset. Column 470 of the status table 500 indicates that the phone is currently with the user, the watch is being worn, and the headset is in the user's ear. In the scenario depicted in FIG. 5A, the configuration information 364 in the memory of the phone and/or the headset may indicate that the audio of the phone call is to be played over the speaker of the headset. For example, the configuration information 364 may include a rule such as "if phone receives an incoming call, headset is connected, and headset is in ear, then direct the call from the phone to the headset." FIG. 5A illustrates an example of how status information can be used to determine when to forward media content (in this example, an audio stream) to a mobile device. Other types of data, such as sensor data, can be forwarded in a similar manner.

FIG. 5B shows a status table 510 representative of the status table 500 of FIG. 5A after the user moves away from the phone. As shown in FIG. 5B, column 470 has been updated to indicate that the phone is not with the user.

Because the user is still wearing the watch and the headset, the phone is no longer reachable through BT or BTLE. However, due to the phone moving out of BT/BTLE range, the watch may have established LTE and Wi-Fi connections to the phone, as shown in columns 430 and 440. Additionally, the watch and headset may remain in BT/BTLE communication with each other in the absence of the phone. Accordingly, columns 450 and 460 continue to show that there are BT/BTLE connections to the watch and the headset. In the scenario depicted in FIG. 5B, the phone may be configured to trigger forwarding of the call audio to the watch (e.g., through a Wi-Fi based cloud service or a Voice over LTE (VoLTE) handoff procedure), and the watch may in turn provide the call audio to the headset via BT/BTLE. The forwarding can be based on a rule (e.g., in configuration information 364 of the watch and/or the phone) such as "if phone is engaged in a phone call, phone is not with user, headset is connected, and headset is in ear, then stream the call over the headset, using watch to supply the stream."

FIG. 5C shows a status table 520 representative of the status table 510 of FIG. 5B after the user removes the headset. As shown in FIG. 5C, column 470 has been updated to indicate that the headset is no longer in the user's ear. The connectivity among the phone, watch, and headset remains the same as in FIG. 5B. In the scenario shown in FIG. 5C, the phone may continue to allow the watch to receive the call, but the configuration information 364 of the phone and/or the watch may cause the watch to play the call audio over the speaker of the watch instead of over the headset. For example, the phone and/or the watch may be configured with a rule such as "if phone is engaged in a phone call, phone is not with user, and headset is not in ear or not connected, then stream the call over the watch."

FIGS. 5A to 5C illustrate some examples of how to determine which mobile device to use for processing one type of data (call audio) based on status information and configuration information. Other types of data (e.g., audio files, videos, short message service (SMS) or other text messages, email, etc.) can be handled in a similar manner. Likewise, the determination of which mobile device to use for processing heart rate, device orientation, or other sensor data captured by a mobile device in the system can be determined using status information in combination with configuration information.

As discussed above, configuration information can be device-specific or application-specific. A mobile device receiving sensor data or other data may determine, based on a configuration applicable to the mobile device, how to use the received data. For example, the call audio in the scenarios discussed in connection with FIGS. 5A to 5C may be handled according to configurations associated with a call management/dialer application installed on the phone and the watch. In the case of sensor data, the sensor data can be provided as input to a software application of a receiving mobile device under an appearance of having been generated by a local sensor. For example, heart rate data captured by wearable health tracker 112 can be made available to a fitness application on the mobile phone 110 under an appearance of having been captured by a heart rate sensor of the mobile phone even though the mobile phone 110 may not actually be equipped with a heart rate sensor. When a connection is established between the wearable health tracker 112 and the mobile phone 110, the heart rate sensor of the wearable health tracker 112 can be made visible to the mobile phone 110 and/or the fitness application on the mobile phone as being a hardware component of the mobile phone 110. From the perspective of the fitness application on the mobile phone, the heart rate data is provided by a heart rate sensor of the mobile phone 110, not the heart rate sensor of the mobile phone 110. In effect, the physical heart rate sensor of the wearable health tracker becomes a virtual sensor of the mobile phone. Thus, the fitness application on the mobile phone may not be aware that the heart rate data is originating from the wearable health tracker 112. In this manner, connected mobile devices can be viewed as sharing a pool of sensors or other data sources. In some embodiments, a central mobile device (e.g., an RoT device such as mobile phone 110) may be configured to operate as a sensor hub that collects sensor data from other mobile devices and distributes the sensor data among the mobile devices under the conditions specified by configuration information in the central mobile device and/or configuration in another mobile device (e.g., the mobile device that is to receive the sensor data).

Figure 6:
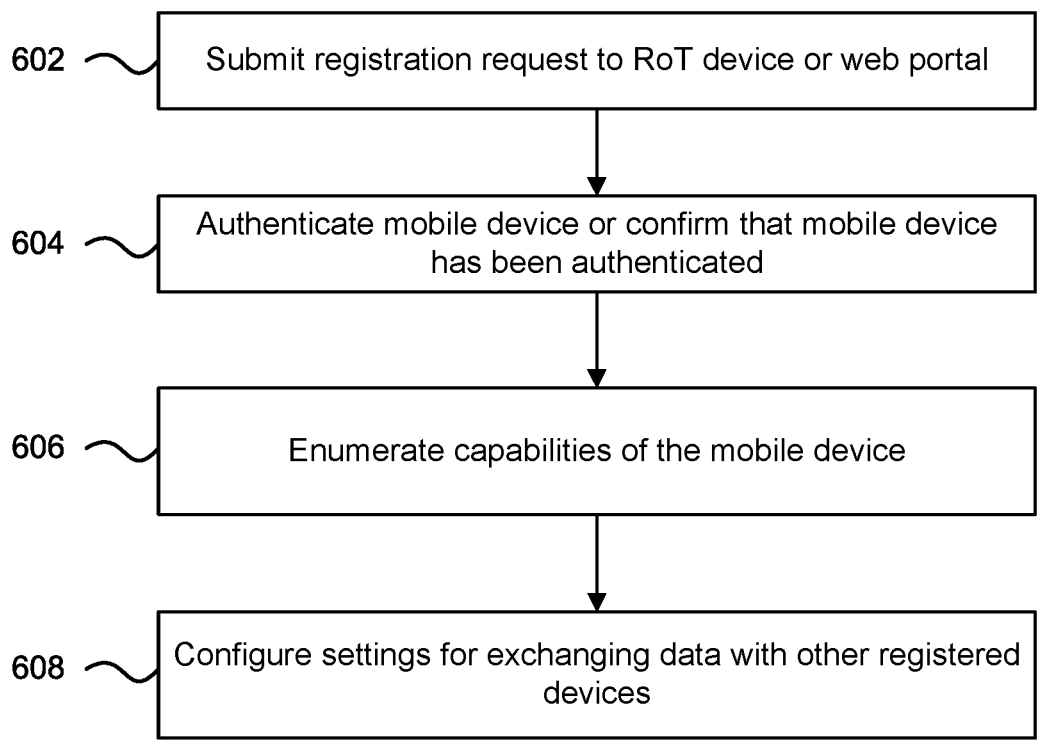
FIG. 6 is a flow chart illustrating a process for registering and configuring a mobile device, according to an embodiment.

FIG. 6 is a flow chart of a process 600 for registering and configuring a mobile device, according to an embodiment. Means for performing the functionality illustrated in the blocks shown in FIG. 6 may include hardware and/or software components of a mobile device being registered. Examples components of a mobile device are illustrated in FIG. 3, described above.

At block 602, a registration request is submitted to an RoT device or a web portal. The registration request can be submitted using a communications subsystem of the mobile device being registered. For example, the wireless communication interface 332 of the mobile device may establish a wireless connection to the RoT device or access an IP address associated with the web portal, e.g., using a web browser installed on the mobile device. In some embodiments, the RoT device and the mobile device being registered have a device management application installed that permits the user to register the mobile device through communication between the device management application executing on both devices.

At block 604, the mobile device is authenticated or confirmed to have already been authenticated. Block 604 may involve an authentication procedure between the mobile device and the RoT device, e.g., through the user logging into the device management application on the mobile device, using credentials associated with the user. In some embodiments, the RoT device may prompt the user to input a security code on the mobile device, e.g., a one-time PIN code generated and displayed by the RoT device. Similarly, if registration is performed through a web portal, the user may log into the web portal using their credentials. In this manner, the mobile device can be verified as being a device that belongs to the user.

At block 606 the capabilities of the mobile device are enumerated to the RoT device or the machine providing the web portal. For instance, the mobile device may send a message that lists all sensors and/or other hardware components of the mobile device. The message can be in any standard format, such as Extensible Markup Language (XML). Upon receiving the message, the RoT device or the machine providing the web portal may generate a record of the mobile device and its capabilities. For instance, the record may be added to a list of mobile devices that have been registered in association with the user. In some embodiments, the updated list is broadcast to other registered devices. For example, RoT device may send the updated list to other mobile devices that are actively connected and may also schedule transmission of the updated list to any registered devices that are offline. Additionally or alternatively, mobile devices can be configured to broadcast their capabilities upon establishing a wireless connection to another registered mobile device. For example, after successful authentication or confirmation in block 604, the mobile device submitting the registration request in block 602 may establish a connection to a Wi-Fi subnet that the RoT device and other mobile devices are connected to, thereby enabling the other mobile devices to discover and exchange messages with the mobile device. Likewise, the mobile device can be discovered upon establishing a BT/BTLE or other wireless connection to another mobile device.

At block 608, settings for exchanging data with other registered devices are configured. The functionality in block 608 can be implemented through a user interface, e.g., an interface provided by the device management application, that permits the user to customize what types of data are permitted to be sent from the mobile device and/or what types of data are permitted to be received by the mobile device. Permissions can be set at the device level and/or the application level. For example, the device management application may provide the user with an option to allow or disallow sharing of sensor data with other mobile devices or with specific applications executed on the other mobile devices. Thus, the device management application may enable customized permission levels for sensor data or other data.

FIG. 7 shows an example configuration table 700 for a mobile device (e.g., wearable health tracker 112), according to an embodiment. The configuration table 700 can be generated as part of performing the functionality in block 608 of FIG. 6. In some embodiments, each mobile device maintains its own configuration table 700 in local memory. The configuration table 700 can, for example, be stored as configuration information 364 in FIG. 3. The configuration table shown in FIG. 7 is a simplified example in which permissions are specified at the device level. However, as discussed above, permissions can also be specified at the application level. In other embodiments, mobile devices may share a single configuration table that indicates configurations for all the mobile devices.

Configuration table 700 includes a column 710 indicating what data sources are available on the mobile device. Such data sources can include sensors, for example, a microphone, an accelerometer, a gyroscope, and a heart rate sensor. Data sources can also include sources of media content, such as stored media (e.g., images, videos, electronic documents, etc.). Configuration table 700 further includes a column 720 indicating what devices and/or applications are permitted to receive each type of data represented in column 710. For example, as shown in FIG. 7, stored media is shared only with a phone (e.g., mobile phone 110), audio captured by the microphone is shared only with other devices that are registered to the same user identifier, and heart rate data captured by the heart rate sensor is shared with the phone only. Additionally, some types of data may be shared with any connected mobile device. For example, accelerometer data and gyroscope data may be shared with a connected mobile device regardless of whether the connected mobile device is registered to the same user identifier.

Configuration table 700 can also include a column 730 indicating conditions for forwarding the data represented in column 710. For instance, stored media and gyroscope data may only be forwarded upon request from another mobile device. Other types of data (e.g., microphone captured audio, accelerometer data, and heart rate data) may be subject to forwarding rules such as the rules discussed above in connection with the examples of FIGS. 5A to 5C. Such rules may reference status information so that data is forwarded when one or more conditions relating to the status of a mobile device and/or the user are satisfied (e.g., "if phone receives an incoming call, headset is connected, and headset is in ear, then direct the call from the phone to the headset").

Figure 8:
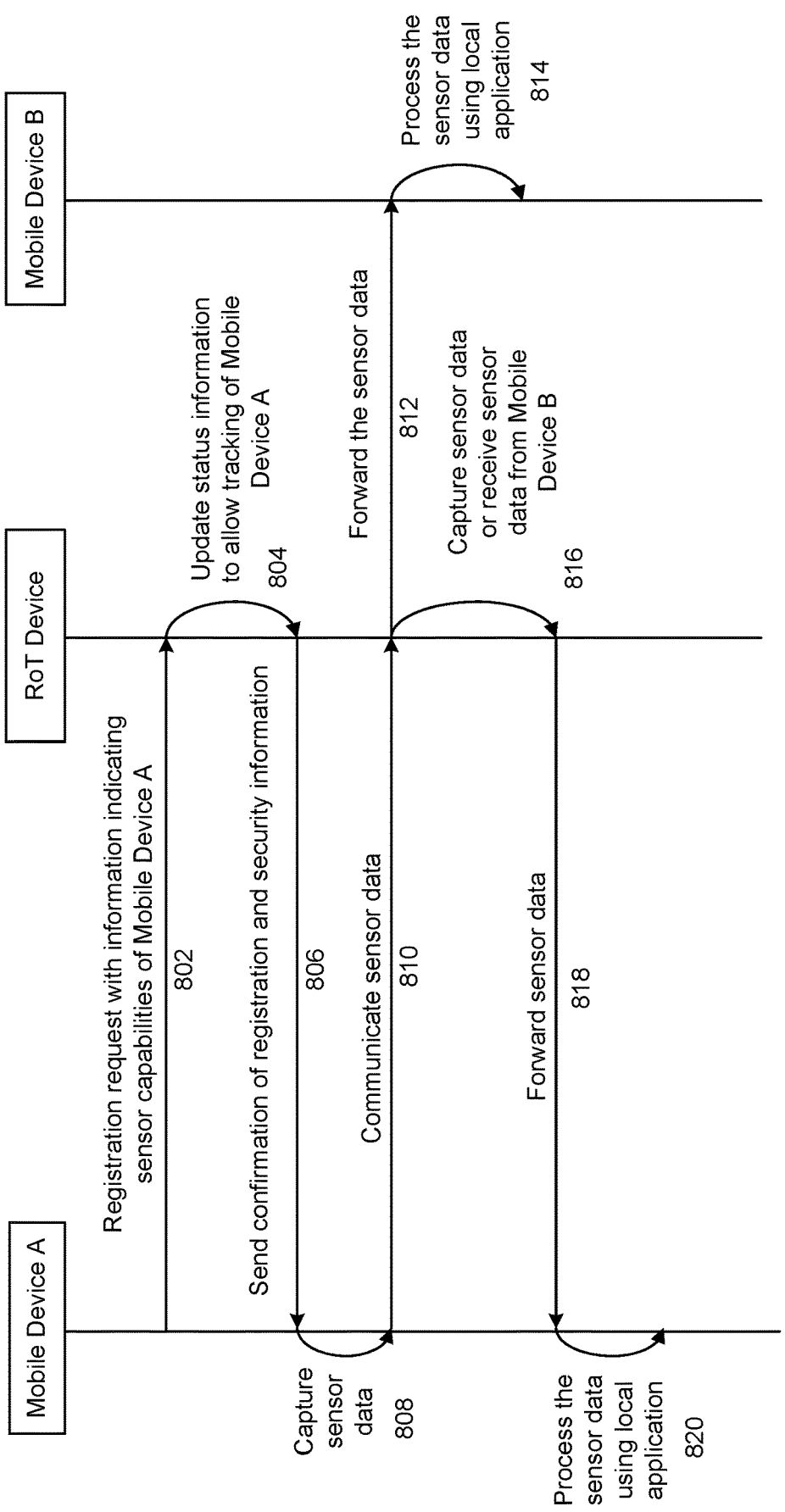
FIG. 8 is a flow diagram illustrating a process for sharing data among mobile devices, according to an embodiment.

FIG. 8 is a flow diagram illustrating a process 800 for sharing data among mobile devices, according to an embodiment. In the example of FIG. 8, an RoT device is configured to operate as an aggregator of sensor data captured by the RoT device and other mobile devices in the system (e.g., mobile device A and mobile device B). For instance, the RoT device in FIG. 8 may correspond to mobile phone 110 and may collect sensor data from other mobile devices that are connected (directly or indirectly) to the mobile phone 110. In some embodiments, the collection by the RoT device is limited to sensor data captured using a mobile device that is registered in association with the user's IMSI.

At block 802, a registration request is sent from mobile device A to the RoT device together with information indicating sensor capabilities of mobile device A. The functionality in block 802 can be implemented in accordance with the processing depicted in FIG. 6.

At block 804, the RoT device updates status information to allow tracking of mobile device A. For instance, the RoT device may update a list of registered devices maintained in a memory of the RoT device. Adding mobile device A to the list of registered devices allows the RoT device and/or other registered devices to track the status of mobile device A.

At block 806, the RoT device sends a confirmation of registration to mobile device A together with security information. The security information may indicate a security protocol and a corresponding security artifact (e.g., an encryption key) for mobile device A to use when sending sensor data.

At block 808, mobile device A captures sensor data. The sensor data is sent to the RoT device (block 810). In turn, the RoT device forwards the sensor data to mobile device B (block 812). The forwarding of the sensor data in block 812 may be performed according to configuration information maintained by the RoT device. For example, as part of the processing in block 608 of FIG. 6, the user may have specified that sensor data of the type captured in block 808 be forwarded to mobile device B upon one or more conditions being satisfied or upon request from mobile device B.

At block 814, mobile device B processes the sensor data that was forwarded in block 812. The sensor data may be processed using an application executing on mobile device B. As discussed above, when sensor data is communicated to a mobile device from another mobile device, the sensor data can be input to an application of the receiving device (e.g., through an application program interface) under an appearance of having been captured by a sensor of the receiving device. Thus, the sensor that captured the sensor data in block 808 may be appear to the application executing on mobile device B as being a sensor of mobile device B.

At block 816, the RoT device captures sensor data using a local sensor or, alternatively, receives sensor data captured by mobile device B. The sensor data in block 816 is then forwarded to mobile device A (block 818) by the RoT device. Like the forwarding in block 812, the forwarding in block 818 can be performed based on configuration information relating to the type of data captured/received in block 816.

At block 820, mobile device A processes the sensor data that was forwarded in block 818, using an application executing on mobile device A. In this manner, both mobile device A and mobile device B may receive sensor data captured by a different mobile device. In some instances, the RoT device may act as the consumer of sensor data (e.g., data captured by mobile device A or mobile device B).

Figure 9:
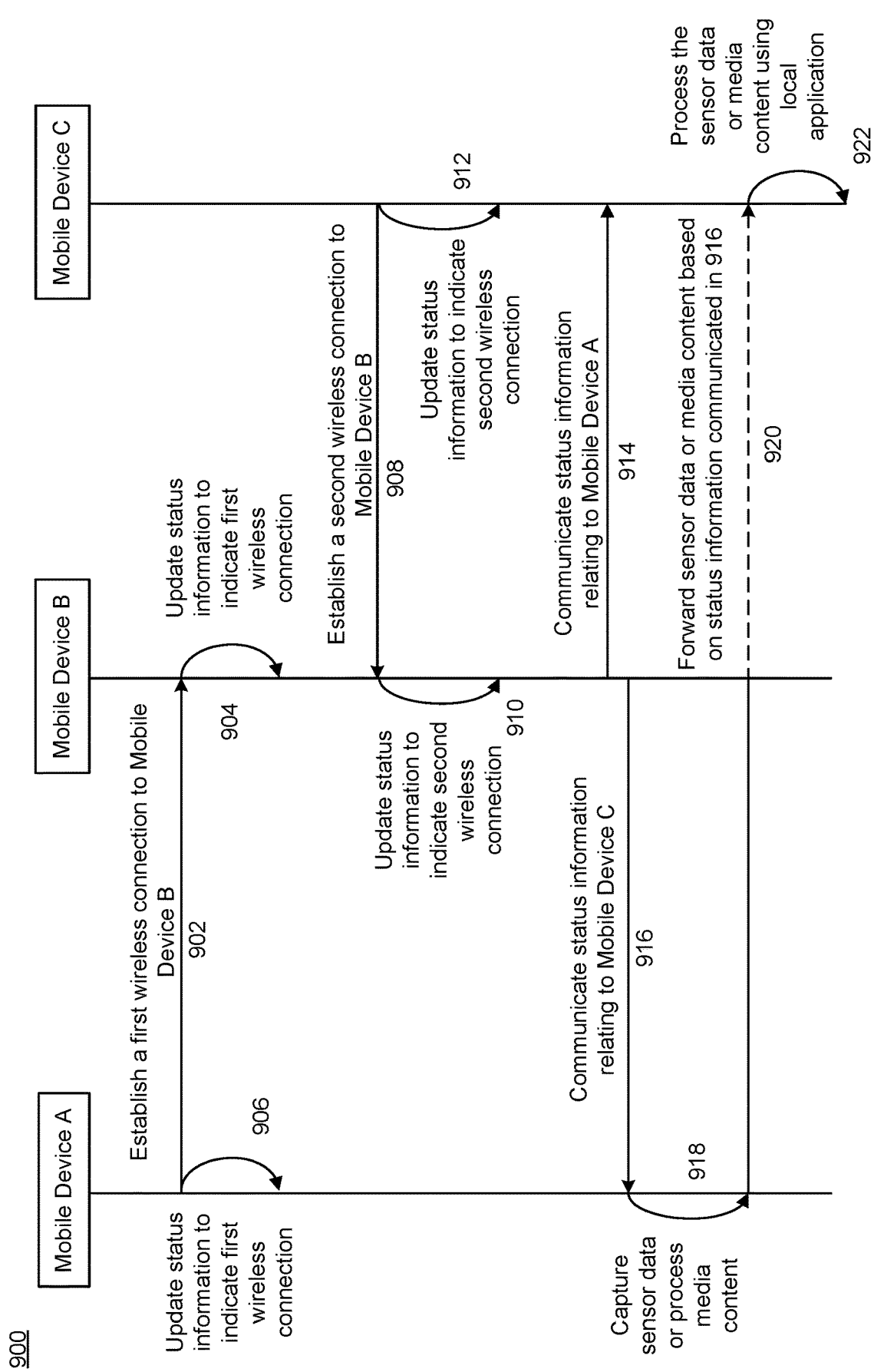
FIG. 9 is a flow diagram illustrating a process for sharing data among mobile devices, according to an embodiment.

FIG. 9 is a flow diagram illustrating a process 900 for sharing data among mobile devices, according to an embodiment. FIG. 9 shows an example of how mobile devices that are connected (e.g., mobile device A, mobile device B, and mobile device C) can track status changes through inter-device communication and send data to each other based on status information.

At block 902, mobile device A establishes a first wireless connection to mobile device B. For example, mobile device A may correspond to AR/VR headset 117, mobile device B may correspond to mobile phone 110, and the first wireless connection may be a BT or BTLE connection. When the first wireless connection has been established, mobile device B may update its locally maintained status information to indicate the first wireless connection (block 904). For example, mobile device B may update its status table 400 to indicate that there is a BT connection to mobile device A. Similarly, mobile device A may update its locally maintained status information (block 906) to indicate that there is a BT connection to mobile device B.

At block 908, mobile device C establishes a second wireless connection (e.g., a Wi-Fi connection) to mobile device B. Similar to the processing in blocks 904 and 906, mobile device B may update its local status information to indicate the second wireless connection (block 910), and mobile device C may do the same (block 912).

At this point in time, mobile device A and mobile device C are not directly connected. However, due to both devices being connected to mobile device B, mobile device A and mobile device C may discover each other. For example, because mobile device B is aware that it is connected to mobile devices A and C, the mobile device B may communicate to mobile device C status information relating to mobile device A (block 914). The status information communicated in block 914 can include information regarding the first wireless connection (e.g., information indicating that the first wireless connection is a BT connection and a MAC address of mobile device A). Similarly, the mobile device B may communicate to mobile device A status information relating to mobile device C (block 916). The status information communicated in blocks 914 and 916 can also include information on the status of the user (e.g., the user is wearing mobile device A, the user is carrying mobile device C, etc.).

At block 918, mobile device A captures sensor data using a local sensor. Alternatively, mobile device A may process media content at block 918. The media content can be content stored in a memory of mobile device A (e.g., an audio file). In some instances, the media content may be content that is sent to the mobile device A for processing (e.g., an audio stream from a remote server).

At block 920, the sensor data or media content from block 918 is forwarded to mobile device C. The forwarding in block 920 can be performed by mobile device A itself or through mobile device B acting as an intermediary. Additionally, the forwarding in block 920 may be performed in response to any one of the mobile devices (A, B, or C) detecting that one or more conditions for forwarding of the sensor data/media content are satisfied. For example, mobile device C may be configured with a rule that specifies when mobile device C should receive sensor data of the type captured in block 918. In response to detecting that one or more conditions associated with the rule are satisfied, mobile device C may send a request to mobile device A for the sensor data, where the request is routed through mobile device B. Alternatively, mobile device C may send the request directly to mobile device A by establishing a wireless connection to mobile device A (e.g., using the MAC address of device A as communicated in block 914). Similarly, mobile device A or mobile device B may determine that one or more conditions for forwarding the sensor data/media content from block 918 are satisfied and, in response, may cause the sensor data/media content to be forwarded to mobile device C without an explicit request from mobile device C. For example, the configuration information maintained by mobile device A and/or mobile device B may indicate that mobile device C is subscribed to the type of data captured in block 918.

At block 922, mobile device C processes the sensor data/media content from block 920, using a local application. The processing of the sensor data/media content by mobile device C may or may not be related to a reason why the sensor data was captured or the media content was processed by mobile device A. For instance, an application executing on mobile device A may use the sensor data/media content for a different purpose than an application executing on mobile device C. Alternatively, as indicated above in the examples of FIGS. 5A to 5C, forwarding of data can be performed in connection with performing the same type of data operation on different devices, e.g., switching from using one device to another device to maintain continuity of audio output during a phone call.

Figure 10:
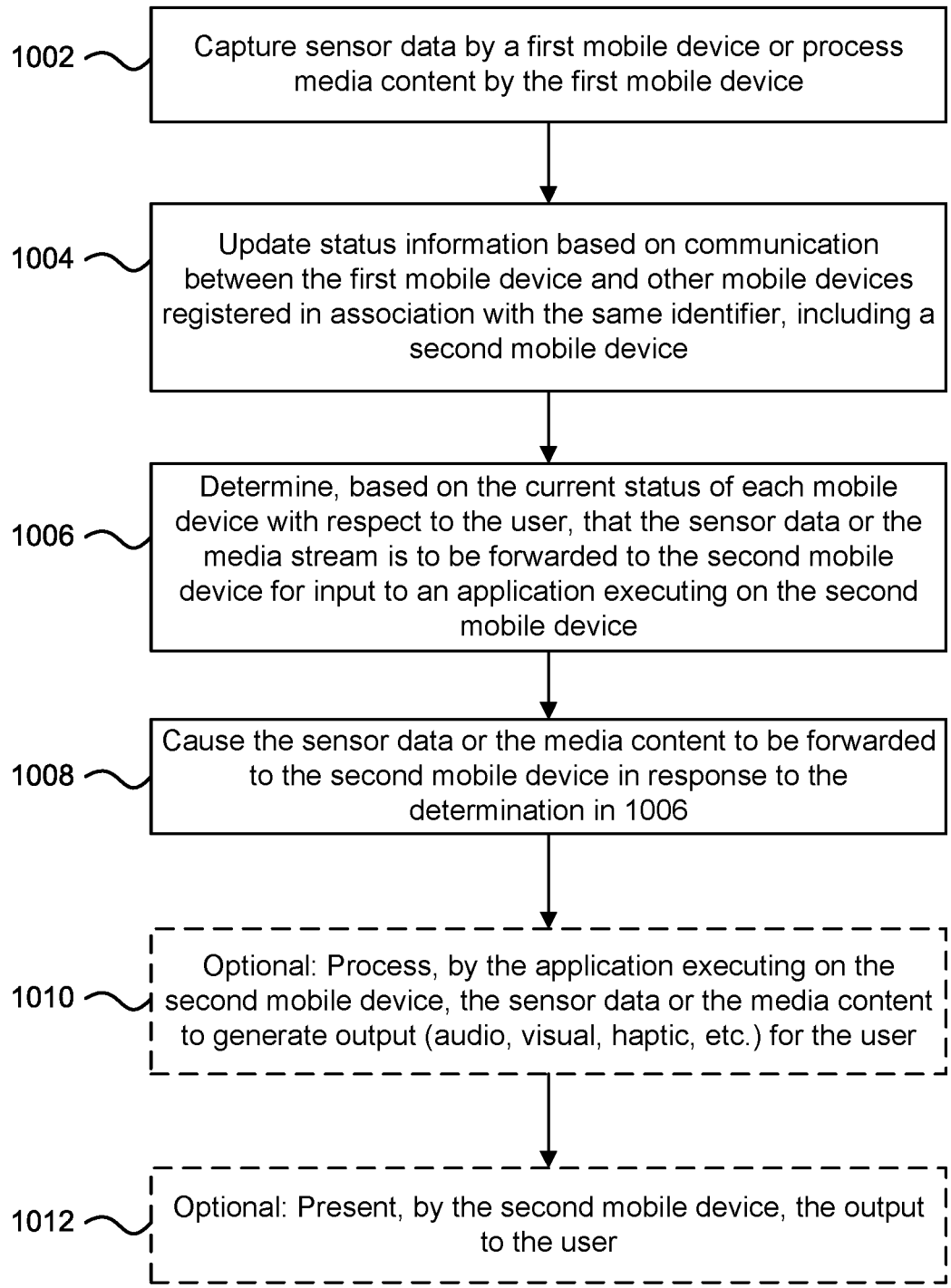
FIG. 10 is a flow chart illustrating a process for sharing data among mobile devices, according to an embodiment.

FIG. 10 is a flow chart illustrating a process 1000 for sharing data among mobile devices, according to an embodiment. Means for performing the functionality illustrated in the blocks shown in FIG. 10 may include hardware and/or software components of a first mobile device and hardware and/or software components of a second mobile device in wireless communication with the first mobile device. Example components of a mobile device are illustrated in FIG. 3, described above. The first mobile device and the second mobile device may correspond to different mobile devices in the system of FIG. 1 or the system of FIG. 2.

At block 1002, the first mobile captures sensor data or processes media content. For example, the first mobile device may be a mobile phone that captures a user's voice using a built-in microphone or other sensor 320. Media content processed at block 1002 may include audio and/or visual content that is stored locally at the first mobile device or remotely (e.g., a song stored on a cloud server). Processing of media content at block 1002 can be performed using one or more processing units 310 of the first mobile device and may involve generating audio and/or visual output for the user of the first mobile device (e.g., playing a song on a speaker of the first mobile device).

In most instances, the first mobile device and the second mobile device are operated by and registered to the same user (e.g., the owner of mobile phone 110). Thus, the first mobile device and the second mobile device may be members of a group of mobile devices that are registered in association with an identifier of a single person (e.g., the IMSI of the account holder for the mobile phone 110, a username of the account holder, etc.). For example, the first mobile device may be a mobile phone and the second mobile device may be a smartwatch, audio-only headset, or AR/VR headset operated by the owner of the mobile phone. Accordingly, the functionality in FIG. 6 is described under the assumption that a single user is operating both the first mobile device and the second mobile device. However, there may be situations where the first mobile device and the second mobile device are operated by different users. For example, the first mobile device could be a mobile phone operated by a parent, and the second mobile device could be a tablet computer operated by the parent's child. Further, the parent may have configured the first mobile device and the second mobile device to share certain types of data taking into consideration that the user of the second mobile device is the child, e.g., enabling streaming of children's videos stored on the first mobile device for viewing on the second mobile device, enabling GPS-based tracking of the second mobile device by the first mobile device, etc.

At block 1004, status information is updated based on communication between the first mobile device and the second mobile device. The first mobile device and the second mobile device may be in direct communication with each other, e.g., via a BT/BTLE or Wi-Fi connection, or using some other wireless communication protocol. In some instances, the first mobile device and the second mobile device may be indirectly connected via one or more intermediary devices, for example, an RoT device that operates as an aggregator of sensor or other data. The status information in block 1004 may indicate the operational status of each mobile device in the group of mobile devices, including the statuses of the first mobile device and the second mobile device. For instance, the status information may indicate what type of wireless connection/wireless protocol each mobile device is current using, if any, to communicate with another mobile device among the group of mobile devices. Additionally, as discussed above, status information may indicate a status of a user, including the status of each mobile device in the group with respect to a user of the mobile device. Thus, block 1004 may involve updating status information maintained in memory of the first mobile device and/or the second mobile device to indicate the types of wireless connections used by the first mobile device and the second mobile device, to indicate whether a user is wearing, carrying, or within operating range of the first mobile device and the second mobile device, or to indicate any number of other statuses. Further, as indicated in the example of FIG. 9, each mobile device can update its own status information independently of the updating of status information at another mobile device or, alternatively, a mobile device may perform an update based on status information communicated from another mobile device.

At block 1006, a determination is made, based on the current status of each mobile device with respect to the user (as indicated in the updated status information), that the sensor data or media stream from block 1002 is to be forwarded to the second mobile device for input to a software application executing on the second mobile device. For example, the determination in block 1006 may be a determination that an audio stream being processed by the first mobile device is to be forwarded to the second mobile device based on a status of the first mobile device with respect to the user and/or a status of the second mobile device with respect to the user. The determination in block 1006 can be made by the first mobile device, the second mobile device, and/or other some other mobile device that is currently connected to either device. For example, the first mobile device and the second mobile device may share the same configuration information (e.g., configuration table 700 in FIG. 7) so that both the first mobile device and the second mobile device are capable of independently determining whether one or more forwarding conditions are satisfied (e.g., when the user of the first mobile device is no longer within operating range of the first mobile device).

In some instances, the determination in block 1006 involves determining that a user's attention is focused on the second mobile device. Such a determination can be made using status information that was generated based on sensor data captured by the second mobile device. For example, if the second mobile device is a headset, the status information may indicate that the user is wearing the headset, in which case it can be inferred that the auditory focal point of the user is the headset rather than some other device that has a speaker. As another example, if the second mobile device is a smartwatch, the status information may indicate that the user is actively using a touchscreen of the smartwatch (e.g., a touch input was detected on the touchscreen within the past thirty seconds), in which case it can be inferred that the visual focal point of the user is the smartwatch rather than some other device that has a display. As yet another example, if the second mobile device is a smartwatch, the status information may indicate that the user is running (e.g., based on detected movement of the user's wrist), in which case the visual focal point of the user is likely the smartwatch since a smartwatch is usually visible when running, whereas other devices such as mobile phones tend to be less visible (e.g., carried in a pocket or armband) when running. A sensory focus of the user can be integrated into the forwarding condition(s), e.g., as a component of a rule used to trigger forwarding.

At block 1008, the sensor data/media content is forwarded to the second mobile device in response to the determination in block 1006. The forwarding in block 1008 can be performed by the first mobile device using a peer to peer connection to the second mobile device. Alternatively, the first mobile device may send the sensor data/media content to an intermediary device that forwards the sensor data/media content to the second mobile device. As discussed above, the determination in block 1006 can be made by the first mobile device, the second mobile device, and/or other some other mobile device that is currently connected to either device. Accordingly, the forwarding in block 1008 can be initiated by the first mobile device, the second mobile device, or some other mobile device. For instance, the second mobile device may send a request for the sensor data/media content to the first mobile device, or the first mobile device may forward the sensor data/media content without an explicit request.

The sensor data/media content can be forwarded to the second mobile in encrypted form, e.g., to prevent an unregistered device from using the sensor data/media content. The encryption can be based on an encryption protocol (e.g., an AES protocol) negotiated between the first mobile device and the second mobile device. Alternatively, if one of the mobile devices in the group is an RoT device, the encryption can be based on an encryption protocol specified by the RoT device. The encryption can be performed by the first mobile device or an intermediary device.

In some instances, the first mobile device may continue using the sensor data or media content after the forwarding in block 1008 has been completed. However, there may be instances where the forwarding is performed as part of switching away from an application executing on the first mobile device to using the application executing on the second mobile device (e.g., forwarding of call audio, as described above in connection with FIGS. 5A to 5C). In such instances, the first mobile device may discontinue or interrupt processing of the sensor data or media content by one or more processing units of the first mobile device. Accordingly, the second mobile device may, after receiving the sensor data or media content that was forwarded in block 1008, consume the sensor data or media content based on a configuration of the application executing on the second mobile device. The consumption of the sensor data or media content by the second mobile device may involve generating output for the user (e.g., blocks 1010 and 1012, as discussed below). However, depending on the configuration of the application executing on the second mobile device, the sensor data or media content could be used in other ways including, but not limited to, processing the sensor data or media content for input to another application on the second mobile device or to an application on a different mobile device, transmitting the sensor data or media content to a remote server for storage and/or downstream processing, and/or using the sensor data to control a component of the second mobile device or change an operating state of the second mobile device (e.g., switching between high and low power modes, adjusting audio volume, etc.).

At block 1010, the application executing on the second mobile device optionally processes the sensor data/media content to generate an output. In some instances, the output generated in block 1010 is output presented to the user of the second mobile device (block 1012). For instance, the application may process the sensor data/media stream to generate audio, visual, haptic, and/or some other form of output that can be presented to the user through an appropriate output device (e.g., a display, a speaker, a vibration-inducing motor, etc.). In other instances, the output can be data that is subjected to further processing by the application or downstream processing by another application (e.g., a second application executing on the second mobile device). However, as discussed above, the sensor data or media content can be used in other ways.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A first mobile device, comprising: a sensor configured to capture sensor data; a memory storing status information about a plurality of mobile devices that are registered in association with an identifier of a user, the plurality of mobile devices including the first mobile device and a second mobile device; and one or more processing units communicatively coupled to the sensor and the memory, the one or more processing units configured to: update the status information based on wireless communication between the first mobile device and other members of the plurality of mobile devices, the wireless communication being performed using one or more wireless communication protocols, wherein the status information is shared among the plurality of mobile devices due to each mobile device being registered in association with the identifier of the user, wherein the status information indicates, for each mobile device, which of the one or more wireless communication protocols the mobile device is currently using to communicate with another mobile device, and wherein the status information further indicates a current status of each mobile device with respect to the user; determine, based on the current status of each mobile device with respect to the user, that the sensor data or a media content being processed by the first mobile device is to be forwarded to the second mobile device for input to a software application executing on the second mobile device; and cause the sensor data or the media content to be forwarded to the second mobile device.

Clause 2. The first mobile device of clause 1, wherein the one or more processing units are configured to determine, based on the current status of each mobile device with respect to the user, that the sensor data is to be forwarded to the second mobile device for input to the software application executing on the second mobile device, and wherein the sensor data is input to the software application under an appearance of having been captured by a sensor of the second mobile device.

Clause 3. The first mobile device of clause 1 or 2, wherein the identifier is an International Mobile Subscriber Identity number.

Clause 4. The first mobile device of any of clauses 1-3, wherein for each mobile device, the status information indicates whether the user is wearing, carrying, or interacting with the mobile device.

Clause 5. The first mobile device of any of clauses 1-4, wherein as part of determining that the sensor data or the media content is to be forwarded to the second mobile device, the one or more processing units are configured to determine, based on the status information, that the user's attention is focused on the second mobile device.

Clause 6. The first mobile device of clause 5, wherein status information indicating that the user's attention is focused on the second mobile device is generated based on sensor data captured by the second mobile device.

Clause 7. The first mobile device of any of clauses 1-6, wherein the first mobile device is configured to: maintain, in the memory, a list of other mobile devices that have been registered in association with the identifier; and track statuses of the other mobile devices using updates to the status information.

Clause 8. The first mobile device of any of clauses 1-7, wherein one of the first mobile device or the second mobile device is a mobile phone, and wherein the other of the first mobile device or the second mobile device is a smartwatch or headset.

Clause 9. The first mobile device of clause 8, wherein the first mobile device is the mobile phone, and wherein the one or more processing units are configured to determine, based on status information indicating that the user is no longer within operating range of the mobile phone, that an audio stream is to be forwarded from the mobile phone to the smartwatch or headset.

Clause 10. The first mobile device of any of clauses 1-9, wherein the first mobile device is configured to forward the sensor data or the media content to the second mobile device using peer to peer communication.

Clause 11. The first mobile device of any of clauses 1-9, wherein the sensor data or the media content is forwarded to the second mobile device from a third mobile device of the plurality of mobile devices.

Clause 12. The first mobile device of any of clauses 1-11, wherein the one or more processing units are configured to encrypt the sensor data or the media content for forwarding to the second mobile device, using an encryption protocol specified by a third mobile device that operates as a Root of Trust for the plurality of mobile devices.

Clause 13. The first mobile device of any of clauses 1-12, wherein the sensor data or the media content is forwarded to the second mobile device as part of switching away from an application executing on the first mobile device to using the application executing on the second mobile device for processing the sensor data or the media content.

Clause 14. A method for sharing data among mobile devices, the method comprising: updating, by a first mobile device among a plurality of mobile devices including a second mobile device, status information stored in a memory of the first mobile device, wherein the updating is based on wireless communication between the first mobile device and other members of the plurality of mobile devices, the wireless communication being performed using one or more wireless communication protocols, wherein the status information is shared among the plurality of mobile devices due to each mobile device being registered in association with an identifier of a user, wherein the status information indicates, for each mobile device, which of the one or more wireless communication protocols the mobile device is currently using to communicate with another mobile device, and wherein the status information further indicates a current status of each mobile device with respect to the user; determining, by the first mobile device and based on the current status of each mobile device with respect to the user, that sensor data captured by the first mobile device or a media content being processed by the first mobile device is to be forwarded to the second mobile device for input to a software application executing on the second mobile device; and causing, by the first mobile device, the sensor data or the media content to be forwarded to the second mobile device.

Clause 15. The method of clause 14, further comprising: determining, by the first mobile device and based on the current status of each mobile device with respect to the user, that the sensor data is to be forwarded to the second mobile device for input to the software application executing on the second mobile device, wherein the sensor data is input to the software application under an appearance of having been captured by a sensor of the second mobile device.

Clause 16. The method of clause 14 or 15, wherein the identifier is an International Mobile Subscriber Identity number.

Clause 17. The method of any of clauses 14-16, wherein for each mobile device, the status information indicates whether the user is wearing, carrying, or interacting with the mobile device.

Clause 18. The method of any of clauses 14-17, further comprising: as part of determining that the sensor data or the media content is to be forwarded to the second mobile device, determining, by the first mobile device and based on the status information, that the user's attention is focused on the second mobile device.

Clause 19. The method of clause 18, wherein status information indicating that the user's attention is focused on the second mobile device is generated based on sensor data captured by the second mobile device.

Clause 20. The method of any of clauses 14-19, further comprising: maintaining, in the memory of the first mobile device, a list of other mobile devices that have been registered in association with the identifier; and tracking, by the first mobile device, statuses of the other mobile devices using the status information.

Clause 21. The method of any of clauses 14-20, wherein one of the first mobile device or the second mobile device is a mobile phone, and wherein the other of the first mobile device or the second mobile device is a smartwatch or headset.

Clause 22. The method of clause 21, wherein the first mobile device is the mobile phone, the method further comprising determining, by the first mobile device and based on status information indicating that the user is no longer within operating range of the mobile phone, that an audio stream is to be forwarded from the mobile phone to the smartwatch or headset.

Clause 23. The method of any of clauses 14-22, further comprising: forwarding, by the first mobile device, the sensor data or the media content to the second mobile device using peer to peer communication.

Clause 24. The method of any of clauses 14-22, wherein the sensor data or the media content is forwarded to the second mobile device from a third mobile device of the plurality of mobile devices.

Clause 25. The method of any of clauses 14-24, further comprising: encrypting the sensor data or the media content for forwarding to the second mobile device, using an encryption protocol specified by a third mobile device that operates as a Root of Trust for the plurality of mobile devices.

Clause 26. The method of any of clauses 14-25, wherein the sensor data or the media content is forwarded to the second mobile device as part of switching away from an application executing on the first mobile device to using the application executing on the second mobile device for processing the sensor data or the media content.

Clause 27. A system comprising: a plurality of mobile devices including a first mobile device and a second mobile device, wherein: each mobile device is equipped with one or more sensors; the mobile devices are configured to communicate with each other using one or more wireless communication protocols; the mobile devices are configured to share status information with each other due to each mobile device being registered in association with an identifier of a user; the status information indicates, for each mobile device, which of the one or more wireless communication protocols the mobile device is currently using to communicate with another mobile device; the status information further indicates a current status of each mobile device with respect to the user; and based on the current status of each mobile device with respect to the user, sensor data captured by the first mobile device or a media content being processed by the first mobile device is forwarded to the second mobile device for input to a software application executing on the second mobile device.

Clause 28. The system of clause 27, wherein based on the current status of each mobile device with respect to the user, the sensor data is forwarded to the second mobile device for input to the software application executing on the second mobile device, and wherein the sensor data is input to the software application under an appearance of having been captured by a sensor of the second mobile device.

Clause 29. The system of clause 27 or 28, wherein the identifier is an International Mobile Subscriber Identity number.

Clause 30. The system of any of clauses 27-29, wherein for each mobile device, the status information indicates whether the user is wearing, carrying, or interacting with the mobile device.

Clause 31. The system of any of clauses 27-30, wherein the sensor data or the media content is forwarded to the second mobile device based on status information indicating that the user's attention is focused on the second mobile device.

Clause 32. The system of clause 31, wherein the status information indicating that the user's attention is focused on the second mobile device is generated based on sensor data captured by the second mobile device.

Clause 33. The system of any of clauses 27-32, wherein each mobile device maintains a list of other mobile devices that have been registered in association with the identifier and is configured to track statuses of the other mobile devices using the status information.

Clause 34. The system of any of clauses 27-33, wherein one of the first mobile device or the second mobile device is a mobile phone, and wherein the other of the first mobile device or the second mobile device is a smartwatch or headset.

Clause 35. The system of clause 34, wherein the first mobile device is the mobile phone, and wherein based on status information indicating that the user is no longer within operating range of the mobile phone, an audio stream is forwarded from the mobile phone to the smartwatch or headset.

Clause 36. The system of any of clauses 27-35, wherein the sensor data or the media content is forwarded to the second mobile device using peer to peer communication between the first mobile device and the second mobile device.

Clause 37. The system of any of clauses 27-35, wherein the sensor data or the media content is forwarded to the second mobile device from a third mobile device of the plurality of mobile devices.

Clause 38. The system of any of clauses 27-37, wherein the plurality of mobile devices includes a third mobile device operating as a Root of Trust (RoT), and wherein in its capacity as the RoT, the third mobile device specifies an encryption protocol used to encrypt the sensor data or the media content for forwarding to the second mobile device.

Clause 39. The system of any of clauses 27-38, wherein the sensor data or the media content is forwarded to the second mobile device as part of switching away from an application executing on the first mobile device to using the application executing on the second mobile device for processing the sensor data or the media content.

Clause 40. A non-transitory computer-readable medium storing instructions that, when executed by one or more processors, cause the one or more processors to: update status information stored in a memory of a first mobile device among a plurality of mobile devices including a second mobile device, wherein the updating is based on wireless communication between the first mobile device and other members of the plurality of mobile devices, the wireless communication being performed using one or more wireless communication protocols, wherein the status information is shared among the plurality of mobile devices due to each mobile device being registered in association with an identifier of a user, wherein the status information indicates, for each mobile device, which of the one or more wireless communication protocols the mobile device is currently using to communicate with another mobile device, and wherein the status information further indicates a current status of each mobile device with respect to the user; determine, based on the current status of each mobile device with respect to the user, that sensor data captured by the first mobile device or a media content being processed by the first mobile device is to be forwarded to the second mobile device for input to a software application executing on the second mobile device; and forward the sensor data or the media content to the second mobile device.

Clause 41. A system, comprising: means for updating status information stored in a memory of a first mobile device among a plurality of mobile devices including a second mobile device, wherein the updating is based on wireless communication between the first mobile device and other members of the plurality of mobile devices, the wireless communication being performed using one or more wireless communication protocols, wherein the status information is shared among the plurality of mobile devices due to each mobile device being registered in association with an identifier of a user, wherein the status information indicates, for each mobile device, which of the one or more wireless communication protocols the mobile device is currently using to communicate with another mobile device, and wherein the status information further indicates a current status of each mobile device with respect to the user; means for determining, based on the current status of each mobile device with respect to the user, that sensor data captured by the first mobile device or a media content being processed by the first mobile device is to be forwarded to the second mobile device for input to a software application executing on the second mobile device; and means for forwarding the sensor data or the media content to the second mobile device.

What is claimed is:

1. A first mobile device, comprising:
a sensor configured to capture sensor data;
a memory storing status information about a plurality of mobile devices that are registered in association with an identifier of a user, the plurality of mobile devices including the first mobile device and a second mobile device; and
one or more processing units communicatively coupled to the sensor and the memory, the one or more processing units configured to:
update the status information based on wireless communication between the first mobile device and other members of the plurality of mobile devices, the wireless communication being performed using one or more wireless communication protocols, wherein the status information is shared among the plurality of mobile devices due to each mobile device being registered in association with the identifier of the user, wherein the status information indicates, for each mobile device, which of the one or more wireless communication protocols the mobile device is currently using to communicate with another mobile device, and wherein the status information further indicates a current status of each mobile device with respect to the user;
determine, based on the current status of each mobile device with respect to the user, that the sensor data or a media content being processed by the first mobile device is to be forwarded to the second mobile device for input to a software application executing on the second mobile device; and
cause the sensor data or the media content to be forwarded to the second mobile device.

2. The first mobile device of claim 1, wherein the one or more processing units are configured to determine, based on the current status of each mobile device with respect to the user, that the sensor data is to be forwarded to the second mobile device for input to the software application executing on the second mobile device, and wherein the sensor data is input to the software application under an appearance of having been captured by a sensor of the second mobile device.

3. The first mobile device of claim 1, wherein the identifier is an International Mobile Subscriber Identity number.

4. The first mobile device of claim 1, wherein for each mobile device, the status information indicates whether the user is wearing, carrying, or interacting with the mobile device.

5. The first mobile device of claim 1, wherein as part of determining that the sensor data or the media content is to be forwarded to the second mobile device, the one or more processing units are configured to determine, based on the status information, that the user's attention is focused on the second mobile device.

6. The first mobile device of claim 5, wherein status information indicating that the user's attention is focused on the second mobile device is generated based on sensor data captured by the second mobile device.

7. The first mobile device of claim 1, wherein the first mobile device is configured to:
maintain, in the memory, a list of other mobile devices that have been registered in association with the identifier; and
track statuses of the other mobile devices using updates to the status information.

8. The first mobile device of claim 1, wherein one of the first mobile device or the second mobile device is a mobile phone, and wherein the other of the first mobile device or the second mobile device is a smartwatch or headset.

9. The first mobile device of claim 8, wherein the first mobile device is the mobile phone, and wherein the one or more processing units are configured to determine, based on status information indicating that the user is no longer within operating range of the mobile phone, that an audio stream is to be forwarded from the mobile phone to the smartwatch or headset.

10. The first mobile device of claim 1, wherein the first mobile device is configured to forward the sensor data or the media content to the second mobile device using peer to peer communication.

11. The first mobile device of claim 1, wherein the sensor data or the media content is forwarded to the second mobile device from a third mobile device of the plurality of mobile devices.

12. The first mobile device of claim 1, wherein the one or more processing units are configured to encrypt the sensor data or the media content for forwarding to the second mobile device, using an encryption protocol specified by a third mobile device that operates as a Root of Trust for the plurality of mobile devices.

13. The first mobile device of claim 1, wherein the sensor data or the media content is forwarded to the second mobile device as part of switching away from an application executing on the first mobile device to using the application executing on the second mobile device for processing the sensor data or the media content.

14. A method for sharing data among mobile devices, the method comprising:
- updating, by a first mobile device among a plurality of mobile devices including a second mobile device, status information stored in a memory of the first mobile device, wherein the updating is based on wireless communication between the first mobile device and other members of the plurality of mobile devices, the wireless communication being performed using one or more wireless communication protocols, wherein the status information is shared among the plurality of mobile devices due to each mobile device being registered in association with an identifier of a user, wherein the status information indicates, for each mobile device, which of the one or more wireless communication protocols the mobile device is currently using to communicate with another mobile device, and wherein the status information further indicates a current status of each mobile device with respect to the user;
- determining, by the first mobile device and based on the current status of each mobile device with respect to the user, that sensor data captured by the first mobile device or a media content being processed by the first mobile device is to be forwarded to the second mobile device for input to a software application executing on the second mobile device; and
- causing, by the first mobile device, the sensor data or the media content to be forwarded to the second mobile device.

15. The method of claim 14, further comprising:
- determining, by the first mobile device and based on the current status of each mobile device with respect to the user, that the sensor data is to be forwarded to the second mobile device for input to the software application executing on the second mobile device, wherein the sensor data is input to the software application under an appearance of having been captured by a sensor of the second mobile device.

16. The method of claim 14, wherein the identifier is an International Mobile Subscriber Identity number.

17. The method of claim 14, wherein for each mobile device, the status information indicates whether the user is wearing, carrying, or interacting with the mobile device.

18. The method of claim 14, further comprising:
- as part of determining that the sensor data or the media content is to be forwarded to the second mobile device, determining, by the first mobile device and based on the status information, that the user's attention is focused on the second mobile device.

19. The method of claim 18, wherein status information indicating that the user's attention is focused on the second mobile device is generated based on sensor data captured by the second mobile device.

20. The method of claim 14, further comprising:
- maintaining, in the memory of the first mobile device, a list of other mobile devices that have been registered in association with the identifier; and
- tracking, by the first mobile device, statuses of the other mobile devices using the status information.

21. The method of claim 14, wherein one of the first mobile device or the second mobile device is a mobile phone, and wherein the other of the first mobile device or the second mobile device is a smartwatch or headset.

22. The method of claim 21, wherein the first mobile device is the mobile phone, the method further comprising determining, by the first mobile device and based on status information indicating that the user is no longer within operating range of the mobile phone, that an audio stream is to be forwarded from the mobile phone to the smartwatch or headset.

23. The method of claim 14, further comprising:
- forwarding, by the first mobile device, the sensor data or the media content to the second mobile device using peer to peer communication.

24. The method of claim 14, wherein the sensor data or the media content is forwarded to the second mobile device from a third mobile device of the plurality of mobile devices.

25. The method of claim 14, further comprising:
- encrypting the sensor data or the media content for forwarding to the second mobile device, using an encryption protocol specified by a third mobile device that operates as a Root of Trust for the plurality of mobile devices.

26. The method of claim 14, wherein the sensor data or the media content is forwarded to the second mobile device as part of switching away from an application executing on the first mobile device to using the application executing on the second mobile device for processing the sensor data or the media content.

27. A system comprising:
- a plurality of mobile devices including a first mobile device and a second mobile device, wherein:
  - each mobile device is equipped with one or more sensors;
  - the mobile devices are configured to communicate with each other using one or more wireless communication protocols;
  - the mobile devices are configured to share status information with each other due to each mobile device being registered in association with an identifier of a user;
  - the status information indicates, for each mobile device, which of the one or more wireless communication protocols the mobile device is currently using to communicate with another mobile device;
  - the status information further indicates a current status of each mobile device with respect to the user; and
  - based on the current status of each mobile device with respect to the user, sensor data captured by the first mobile device or a media content being processed by the first mobile device is forwarded to the second mobile device for input to a software application executing on the second mobile device.

28. The system of claim 27, wherein based on the current status of each mobile device with respect to the user, the sensor data is forwarded to the second mobile device for input to the software application executing on the second mobile device, and wherein the sensor data is input to the software application under an appearance of having been captured by a sensor of the second mobile device.

29. The system of claim 27, wherein the identifier is an International Mobile Subscriber Identity number.

30. The system of claim 27, wherein for each mobile device, the status information indicates whether the user is wearing, carrying, or interacting with the mobile device.

31. The system of claim 27, wherein the sensor data or the media content is forwarded to the second mobile device based on status information indicating that the user's attention is focused on the second mobile device.

32. The system of claim 31, wherein the status information indicating that the user's attention is focused on the second mobile device is generated based on sensor data captured by the second mobile device.

33. The system of claim 27, wherein each mobile device maintains a list of other mobile devices that have been registered in association with the identifier and is configured to track statuses of the other mobile devices using the status information.

34. The system of claim 27, wherein one of the first mobile device or the second mobile device is a mobile phone, and wherein the other of the first mobile device or the second mobile device is a smartwatch or headset.

35. The system of claim 34, wherein the first mobile device is the mobile phone, and wherein based on status information indicating that the user is no longer within operating range of the mobile phone, an audio stream is forwarded from the mobile phone to the smartwatch or headset.

36. The system of claim 27, wherein the sensor data or the media content is forwarded to the second mobile device using peer to peer communication between the first mobile device and the second mobile device.

37. The system of claim 27, wherein the sensor data or the media content is forwarded to the second mobile device from a third mobile device of the plurality of mobile devices.

38. The system of claim 27, wherein the plurality of mobile devices includes a third mobile device operating as a Root of Trust (RoT), and wherein in its capacity as the RoT, the third mobile device specifies an encryption protocol used to encrypt the sensor data or the media content for forwarding to the second mobile device.

39. The system of claim 27, wherein the sensor data or the media content is forwarded to the second mobile device as part of switching away from an application executing on the first mobile device to using the application executing on the second mobile device for processing the sensor data or the media content.

40. A non-transitory computer-readable medium storing instructions that, when executed by one or more processors, cause the one or more processors to:

update status information stored in a memory of a first mobile device among a plurality of mobile devices including a second mobile device, wherein the updating is based on wireless communication between the first mobile device and other members of the plurality of mobile devices, the wireless communication being performed using one or more wireless communication protocols, wherein the status information is shared among the plurality of mobile devices due to each mobile device being registered in association with an identifier of a user, wherein the status information indicates, for each mobile device, which of the one or more wireless communication protocols the mobile device is currently using to communicate with another mobile device, and wherein the status information further indicates a current status of each mobile device with respect to the user;

determine, based on the current status of each mobile device with respect to the user, that sensor data captured by the first mobile device or a media content being processed by the first mobile device is to be forwarded to the second mobile device for input to a software application executing on the second mobile device; and forward the sensor data or the media content to the second mobile device.

41. A system, comprising:

means for updating status information stored in a memory of a first mobile device among a plurality of mobile devices including a second mobile device, wherein the updating is based on wireless communication between the first mobile device and other members of the plurality of mobile devices, the wireless communication being performed using one or more wireless communication protocols, wherein the status information is shared among the plurality of mobile devices due to each mobile device being registered in association with an identifier of a user, wherein the status information indicates, for each mobile device, which of the one or more wireless communication protocols the mobile device is currently using to communicate with another mobile device, and wherein the status information further indicates a current status of each mobile device with respect to the user;

means for determining, based on the current status of each mobile device with respect to the user, that sensor data captured by the first mobile device or a media content being processed by the first mobile device is to be forwarded to the second mobile device for input to a software application executing on the second mobile device; and means for forwarding the sensor data or the media content to the second mobile device.

* * * * *